United States Patent
Luo et al.

(10) Patent No.: US 11,747,474 B2
(45) Date of Patent: Sep. 5, 2023

(54) SYSTEMS AND METHODS FOR LASER DISTANCE MEASUREMENT

(71) Applicant: SHENZHEN MILESEEY TECHNOLOGY CO., LTD., Shenzhen (CN)

(72) Inventors: Long Luo, Shenzhen (CN); Zhi Chou, Shenzhen (CN)

(73) Assignee: SHENZHEN MILESEEY TECHNOLOGY CO., LTD., Shenzhen (CN)

(*) Notice: Subject to any disclaimer, the term of this patent is extended or adjusted under 35 U.S.C. 154(b) by 746 days.

(21) Appl. No.: 16/732,383

(22) Filed: Jan. 2, 2020

(65) Prior Publication Data

US 2021/0149049 A1    May 20, 2021

(30) Foreign Application Priority Data

Nov. 18, 2019  (CN) .......................... 201911124059.0
Dec. 12, 2019  (CN) .......................... 201911270451.6

(51) Int. Cl.
G01C 3/08    (2006.01)
G01S 17/36   (2006.01)
G01S 17/26   (2020.01)

(52) U.S. Cl.
CPC .............. *G01S 17/36* (2013.01); *G01S 17/26* (2020.01)

(58) Field of Classification Search
None
See application file for complete search history.

(56) References Cited

U.S. PATENT DOCUMENTS

| 2003/0204345 | A1 | 10/2003 | Giger |
| 2009/0195769 | A1* | 8/2009 | Luo .......................... G01S 17/34 356/4.01 |
| 2011/0051122 | A1 | 3/2011 | Yang |
| 2012/0086933 | A1 | 4/2012 | Spruck et al. |

(Continued)

FOREIGN PATENT DOCUMENTS

| CN | 1609553 A | 4/2005 |
| CN | 101158572 A | 4/2008 |

(Continued)

OTHER PUBLICATIONS

First Office Action in Chinese Application No. 201911270451.6 dated Feb. 3, 2020, 36 pages.

(Continued)

*Primary Examiner* — Mark Hellner
(74) *Attorney, Agent, or Firm* — METIS IP LLC

(57) ABSTRACT

The present disclosure relates to a method and a system for laser distance measurement. The method includes: obtaining, from a control circuit, a synchronization signal; generating, by at least one signal generator, a first periodic signal, a second periodic signal, and a third periodic signal based on the synchronization signal; emitting, by a laser emitting device, a laser beam toward a target, the laser beam being generated under a modulation of the first periodic signal; generating, by an optical detector, a measurement signal in response to a signal mixing of the second periodic signal and a reflected laser beam from the target; and determining a distance to the target based on the measurement signal and the third periodic signal.

20 Claims, 14 Drawing Sheets

(56) References Cited

U.S. PATENT DOCUMENTS

| | | |
|---|---|---|
| 2014/0240693 A1 | 8/2014 | Chou et al. |
| 2016/0266254 A1 | 9/2016 | Ohtomo |
| 2019/0056483 A1 | 2/2019 | Bradley et al. |
| 2020/0018853 A1 | 1/2020 | Hata et al. |
| 2020/0033474 A1 | 1/2020 | Petit |

FOREIGN PATENT DOCUMENTS

| | | | | |
|---|---|---|---|---|
| CN | 101504462 A | 8/2009 | | |
| CN | 201876545 U | 6/2011 | | |
| CN | 202770994 U | 3/2013 | | |
| CN | 104122542 A | 10/2014 | | |
| CN | 105005051 A | 10/2015 | | |
| CN | 105759278 A | 7/2016 | | |
| CN | 106646502 A | 5/2017 | | |
| CN | 106768397 A | 5/2017 | | |
| CN | 107144850 A | 9/2017 | | |
| CN | 107290753 A | 10/2017 | | |
| CN | 207601312 U | 7/2018 | | |
| CN | 109061666 A | 12/2018 | | |
| CN | 109188452 A | 1/2019 | | |
| CN | 109283546 A | 1/2019 | | |
| CN | 208488545 U | 2/2019 | | |
| CN | 109471119 A | 3/2019 | | |
| CN | 109870703 A | 6/2019 | | |
| CN | 109975823 A | * | 7/2019 | ............. G01S 7/484 |
| CN | 209640488 U | 11/2019 | | |
| CN | 209656894 U | 11/2019 | | |
| CN | 112805595 A | * | 5/2021 | ............. G01S 7/484 |
| JP | H0651061 A | 2/1994 | | |

OTHER PUBLICATIONS

First Office Action in Chinese Application No. 201911124059.0 dated Dec. 31. 2019, 12 pages.

* cited by examiner

SYSTEMS AND METHODS FOR LASER DISTANCE MEASUREMENT

CROSS-REFERENCE TO RELATED APPLICATIONS

This application claims priority to Chinese Patent Application No. 201911124059.0, filed on Nov. 18, 2019, and Chinese Application No. 201911270451.6, filed on Dec. 12, 2019, the contents of which are hereby incorporated by reference.

TECHNICAL FIELD

The present disclosure relates to laser distance measurement, and more particularly, relates to methods and systems for measuring a distance using a laser beam.

BACKGROUND

Laser distance measurement is widely used in the fields of industry, construction, safety monitoring, etc. A phase-based measurement device usually sends a high-frequency laser signal to a target, receives a measurement laser signal reflected by the target, and then calculates a phase difference between the two signals to obtain a distance from the target to the measurement device. Since the measurement laser signal is a high-frequency signal, it may be difficult to directly measure the phase difference between the two signals. Usually, a frequency conversion technique is used to indirectly measure this phase difference. The frequency conversion technique includes generating a local oscillator signal that differs from the high-frequency laser signal by a small frequency (e.g., 1 kHZ), mixing the measurement laser signal with the local oscillator signal to obtain a low-frequency measurement signal (e.g., 1 kHZ), and comparing the phase of the low-frequency measurement signal with the phase of a reference signal to obtain the distance-dependent phase difference.

Generally, the reference signal may be generated by means of an electrical mixing process or an optical mixing process. For example, in the electrical mixing process, the local oscillator signal and the electrical signal corresponding to the high-frequency laser signal are directly electrically mixed to generate the reference signal. As another example, in the optical mixing process, two laser transmitters may be used. One of the laser transmitters transmits a light that passes through a fixed reference optical path inside the measurement device, obtains a reference optical signal on the fixed optical path, and generates the reference signal based on the reference optical signal. Alternatively, two optical receivers may be used. The light emitted by the laser transmitter may be splitted into two beams, of which one beam passes a fixed reference optical path inside the measurement device to reach one of the optical receivers to generate the reference signal.

On one hand, when generating a reference signal using the electrical mixing process, two high-frequency electrical signals (e.g., the local oscillator signal and the electrical signal corresponding to the high-frequency laser signal) need to be input into an electrical mixer for mixing. The interaction between the two sets of high-frequency electrical signals may interfere with other signals in the circuit, which may adversely affect the overall measurement result. Moreover, the added electrical mixer also increases the complexity of the circuit. On the other hand, when using the optical mixing process to generate the reference signal, a reference optical signal needs to be mixed with the local oscillator signal. In this case, besides the optical path corresponding to the measurement laser signal, an additional optical path for transmitting the reference optical signal is also required. The additional structure of the optical path will make the measurement device more complex, and also increase the difficulty of subsequent processing.

SUMMARY

One aspect of the present disclosure provides a method for laser distance measurement. The method may include: obtaining, from a control circuit, a synchronization signal; generating, by at least one signal generator, a first periodic signal, a second periodic signal, and a third periodic signal based on the synchronization signal; emitting, by a laser emitting device, a laser beam toward a target, the laser beam being generated under a modulation of the first periodic signal; generating, by an optical detector, a measurement signal in response to a mixing of the second periodic signal and a laser beam reflected from the target (also referred to as "reflected laser beam" for brevity); and determining a distance to the target based on the measurement signal and the third periodic signal.

In some embodiments, the at least one signal generator may include a first frequency divider, a second frequency divider, and a third frequency divider. The first periodic signal, the second periodic signal, and the third periodic signal may be generated by the first frequency divider, the second frequency divider, and the third frequency divider, respectively. In some embodiments, the first frequency divider, the second frequency divider, or the third frequency divider may at least include one decimal frequency divider. In some embodiments, a frequency of the third periodic signal may be equal to the difference between the frequency of the first periodic signal and the frequency of the second periodic signal.

In some embodiments, the first frequency divider, the second frequency divider, and the third frequency divider may divide a same source signal to generate the first periodic signal, the second periodic signal, and the third periodic signal. In some embodiments, the first frequency divider, the second frequency divider, and the third frequency divider may divide at least two different source signals to generate the first periodic signal, the second periodic signal, and the third periodic signal.

In some embodiments, the generating, by the at least one signal generator, the first periodic signal, the second periodic signal, and the third periodic signal based on the synchronization signal may include: controlling, based on the synchronization signal, the at least one signal generator to generate the first periodic signal, the second periodic signal, and the third periodic signal, wherein the phases of the first periodic signal, the second periodic signal, and the third periodic signal are synchronous.

Another aspect of the present disclosure provides a method for laser distance measurement that may increase the utilization efficiency of the laser. The method may include: emitting, by a laser emitting device, a first laser beam toward a target; generating, by an optical detector, a first measurement signal in response to a mixing of a local oscillator signal and a laser beam reflected from the target (also referred to as "reflected first laser beam" for brevity), the first measurement signal corresponding to a periodic sequence; adjusting, based at least in part on one or more signal positions in the periodic sequence, one or more emitting parameters of the laser emitting device to emit a second laser beam toward the target; generating, by the optical detector, a second measurement signal in response to a mixing of the local oscillator signal and a laser beam reflected from the target (also referred to as "a reflected second laser beam" for brevity); and determining, based on the second measurement signal, a distance to the target.

In some embodiments, the first laser beam may have a first periodic sequence, and the frequency of the periodic sequence may be equal to the difference between the frequency of the first periodic sequence and the frequency of the local oscillator signal. In some embodiments, the duration of the first laser beam may be greater than or equal to a cycle of the periodic sequence. In some embodiments, the duration of the first laser beam may be at least 1 to 5 times of the cycle of the periodic sequence. In some embodiments, the duration of the first laser beam may be less than a cycle of the periodic sequence.

In some embodiments, the adjusting, based at least in part on one or more signal positions in the periodic sequence, one or more emitting parameters of the laser emitting device to emit a second laser beam toward the target may include: determining one or more emitting windows based at least in part on the one or more signal positions in the periodic sequence; and emitting the second laser beam according to the one or more emitting windows, wherein the second laser beam may be emitted within the one or more emitting windows and stopped from being emitted out of the one or more emitting windows. In some embodiments, the peak intensity of the second laser beam in the one or more emitting windows may be higher than the peak intensity of the first laser beam.

In some embodiments, the adjusting, based at least in part on one or more signal positions in the periodic sequence, one or more emitting parameters of the laser emitting device to emit a second laser beam toward the target may include: determining one or more emitting windows based at least in part on the one or more signal positions in the periodic sequence; and emitting the second laser beam according to the one or more emitting windows, wherein the peak intensity of the second laser beam in the one or more emitting windows may be higher than the peak intensity of the first laser beam.

In some embodiments, the determining one or more emitting windows may include: determining one or more estimated signal positions based on the one or more signal positions in the periodic sequence; and determining the one or more emitting windows according to the one or more estimated signal positions, each emitting window covering at least one of the one or more estimated signal positions. In some embodiments, at least one of the one or more estimated signal positions may be at the center of its corresponding emitting window. In some embodiments, at least one of the one or more estimated signal positions may be located on the right of the center of its corresponding emitting window.

In some embodiments, the repetition frequency of the one or more emitting windows may be equivalent to the repetition frequency of the periodic sequence. In some embodiments, the width of the one or more emitting windows may be at least 1 to 3 times of the cycle of the first periodic sequence.

One of the embodiments of the present disclosure provides a laser distance measurement device. The laser distance measurement device may include: a control circuit configured to generate a synchronization signal; a signal generation unit configured to generate multiple synchronous periodic signals based on the synchronization signal; a laser emitting device configured to emit a laser beam under a modulation of a periodic signal; an optical detector configured to receive a laser beam reflected from a target, and convert the reflected laser beam into an electric signal; a preprocessing module configured to preprocess a measurement signal (such as filtering the measurement signal, amplifying the measurement signal); and a signal processor configured to determine the distance between the laser distance measurement device and the target based on the (preprocessed) measurement signal and a reference signal.

BRIEF DESCRIPTION OF THE DRAWINGS

The present disclosure is further described in terms of exemplary embodiments. These exemplary embodiments are described in detail with reference to the drawings. These embodiments are not limiting, and in these embodiments, the same number indicates the same structure, wherein.

DETAILED DESCRIPTION

Figure 1:
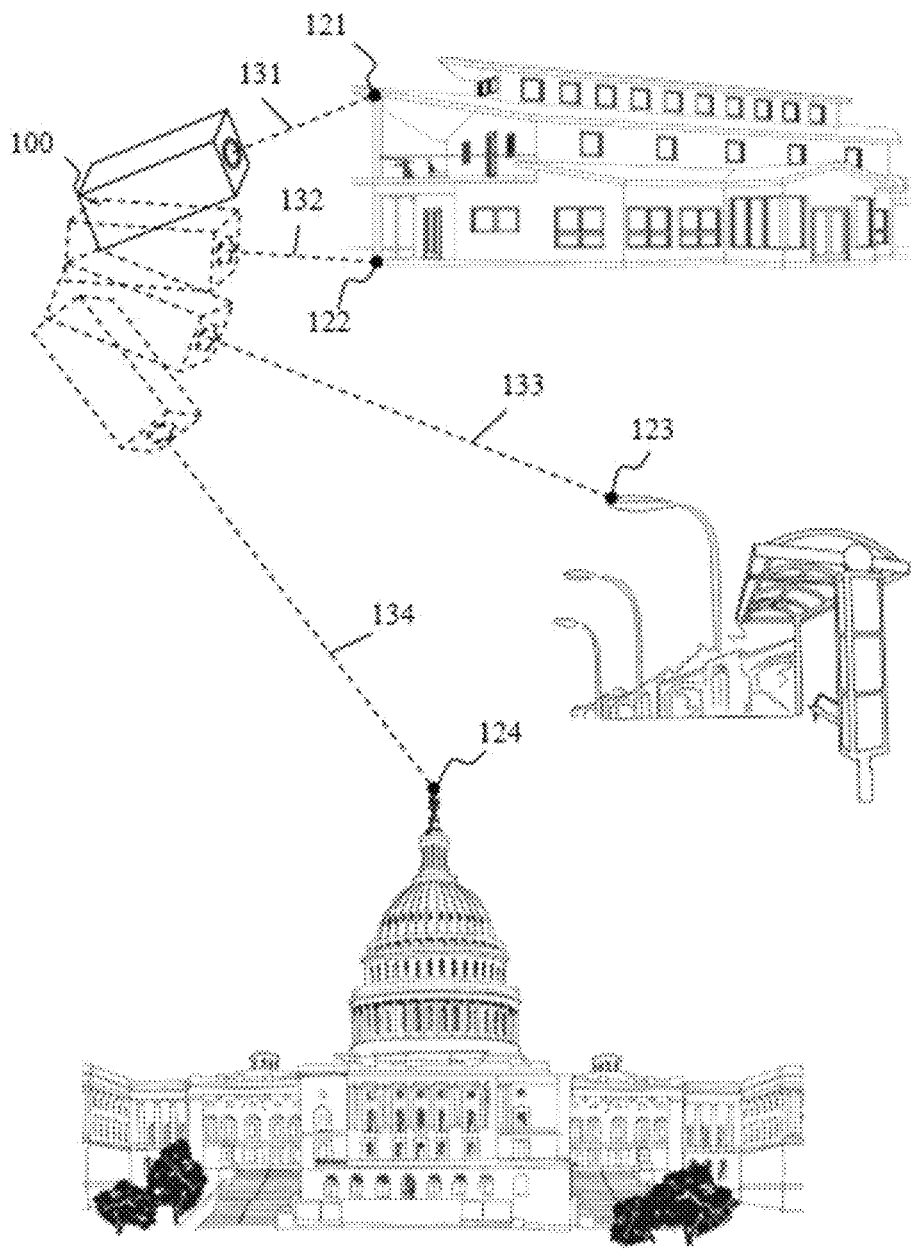
FIG. 1 is a schematic diagram illustrating an exemplary application scenario of laser distance measurement according to some embodiments of the present disclosure.

In order to illustrate the technical solutions related to the embodiments of the present disclosure, the brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. Unless apparent from the locale or otherwise stated, like reference numerals represent similar structures or operation throughout the several views of the drawings.

The terminology used herein is merely for the purposes of describing particular exemplary embodiments and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

The flowcharts used in the present disclosure illustrate operations that systems implement according to some embodiments in the present disclosure. It is to be expressly understood, the operations above or below may or may not be implemented in order. Instead, operations may be processed in reverse order or simultaneously. Besides, one or more other operations may be added to the flow charts, or one or more operations may be omitted from the flow chart.

FIG. 1 is a schematic diagram illustrating an exemplary application scenario of laser distance measurement according to some embodiments of the present disclosure.

As shown in FIG. 1, a laser distance measurement device 100 may measure one or more distances (e.g., distances 131, 132, 133, 134, etc.) between the laser distance measurement device 100 and one or more targets (e.g., targets 121, 122, 123, 124, etc.). The one or more targets may include a spatial point located on an outer surface, an inner surface, an edge line, or any position of one or more objects. For example, a target may be a spatial point such as a vertex, a center of gravity, or a center of an object. The spatial point may be located in any direction of the laser distance measurement device 100.

In some embodiments, the laser distance measurement device 100 may perform measurement and analysis on an object. For example, the laser distance measurement device 100 may measure a distance between the laser distance measurement device 100 and each of a plurality of targets (i.e., spatial points) on the object, and further determine a distance between the plurality of targets.

FIGS. 2A-2D are schematic diagrams of exemplary application scenarios of the laser distance measurement device 100 according to some embodiments of the present disclosure.

The laser distance measurement device 100 may have a variety of application scenarios. For example, four illustrative application scenarios are provided in FIGS. 2A-2D. These four application scenarios are merely for illustration purposes and are not intended to be limiting.

Figure 2A:
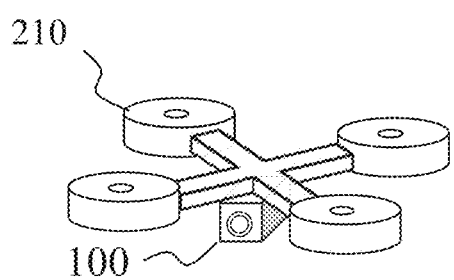
FIGS. 2A-2D are schematic diagrams of exemplary application scenarios of a laser distance measurement device according to some embodiments of the present disclosure.

As shown in FIG. 2A, the laser distance measurement device 100 may be mounted on an aircraft 210. In some embodiments, the aircraft 210 may include a remotely piloted aircraft, an unmanned aerial vehicle (UAV), an airship, an airplane, a helicopter, a hot air balloon, a satellite, a manned spacecraft, a space detector, a space shuttle, a rocket, or the like, or any combination thereof. In some embodiments, the laser distance measurement device 100 and/or the aircraft 210 may perform measurement operations in the air under user control or according to its settings. For example, the laser distance measurement device 100 carried by the aircraft 210 may measure a distance to a target located high above the ground (for example, a target whose vertical distance to the ground exceeds a predetermined threshold), which may be difficult to be detected by a handheld laser distance measurement device. For example, the aircraft 210 may carry the laser distance measurement device 100 to move to a location close to the target located high above the ground. Then, the laser distance measurement device 100 may emit a laser signal and detect a reflected laser signal from the target to estimate the distance from the laser distance measurement device 100 to the target. In some embodiments, the aircraft 210 and/or the laser distance measurement device 100 may include an image sensor (e.g., a camera). In some embodiments, the image sensor may be used to image the front, rear, bottom, or the scene in any other direction of the aircraft 210. The aircraft 210 and/or its remote control terminal may operate the aircraft 210 according to the acquired image(s). Optionally, the user may analyze the acquired image(s) through a remote control terminal (not shown) and remotely control the aircraft 210. In some embodiments, each of the laser distance measurement device 100, the aircraft 210, and the remote control terminal may include a communication interface. The laser distance measurement device 100, the aircraft 210, and the remote control terminal may exchange instructions and data through their communication interfaces. In some embodiments, one or more components of the laser distance measurement device 100 may be integrated into the aircraft 210.

Figure 2B:
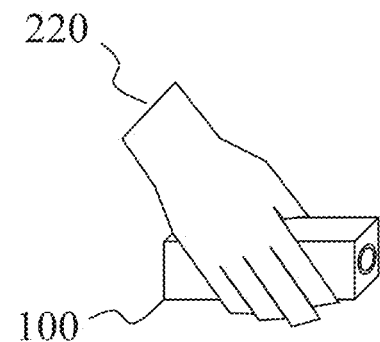

As shown in FIG. 2B, the laser distance measurement device 100 may perform measurements under the control of a hand 220. In some embodiments, the laser distance measurement device 100 may include an interface (e.g., a user interface, a touch screen, a control device, etc.) that facilitates the operation of the hand 220. Optionally, the laser distance measurement device 100 may also include a handheld device such as a handle, a recess, or the like. When using the laser distance measurement device 100, the hand 220 may be in a fixed position or may move freely on the laser distance measurement device 100.

Figure 2C:
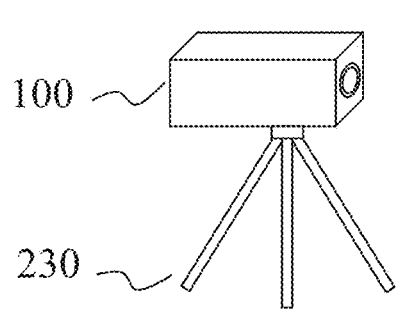

As shown in FIG. 2C, the laser distance measurement device 100 may be mounted on a support 230 for measurement. The support 230 may support the laser distance measurement device 100 to remain stable during the measurement. In some embodiments, the support 230 may drive the movement of the laser distance measurement device 100, such as lifting, rotating, or the like, of the laser distance measurement device 100. The support 230 and/or the laser distance measurement device 100 may move under manual control, a user remote control or according to automatic control of the support 230 (e.g. an automatic control according to its internal programs). In some embodiments, the support 230 may include one or more auxiliary devices such as a microphone, a remote controller, a sighting device, a camera, or the like. Optionally, the support 230 may include a communication module to support the communication between the laser distance measurement device 100 and a remote device. In some embodiments, one or more components of the laser distance measurement device 100 may be integrated into the support 230.

Figure 2D:
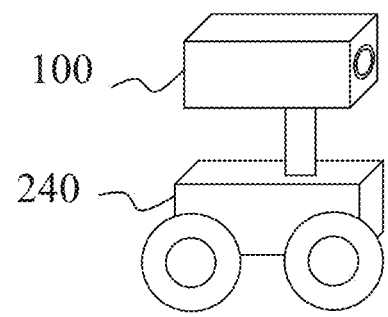

As shown in FIG. 2D, the laser distance measurement device 100 may be mounted on a movable apparatus 240. The movable apparatus 240 may include a remote control car, an unpowered car, a car, a detector (such as a Mars detector, a moon detector, an underwater detector), or the like, or any combination thereof. In some embodiments, the movable apparatus 240 may move in an arbitrary direction (for example, a horizontal direction, a vertical direction, or the like) on the ground, the water, the underwater, or the like, by a wheel, a mechanical arm, or a floating device. The movable apparatus 240 may move autonomously or under user control (e.g. remote control). In some embodiments, one or more components of the laser distance measurement device 100 may be integrated into the movable apparatus 240.

Although only four application scenarios are illustrated in FIGS. 2A-2D, it should be noted that the laser distance measurement device disclosed in the present disclosure may be applied in various other scenarios without departing from the spirit of the present disclosure, and is not limited herein.

Figure 3:
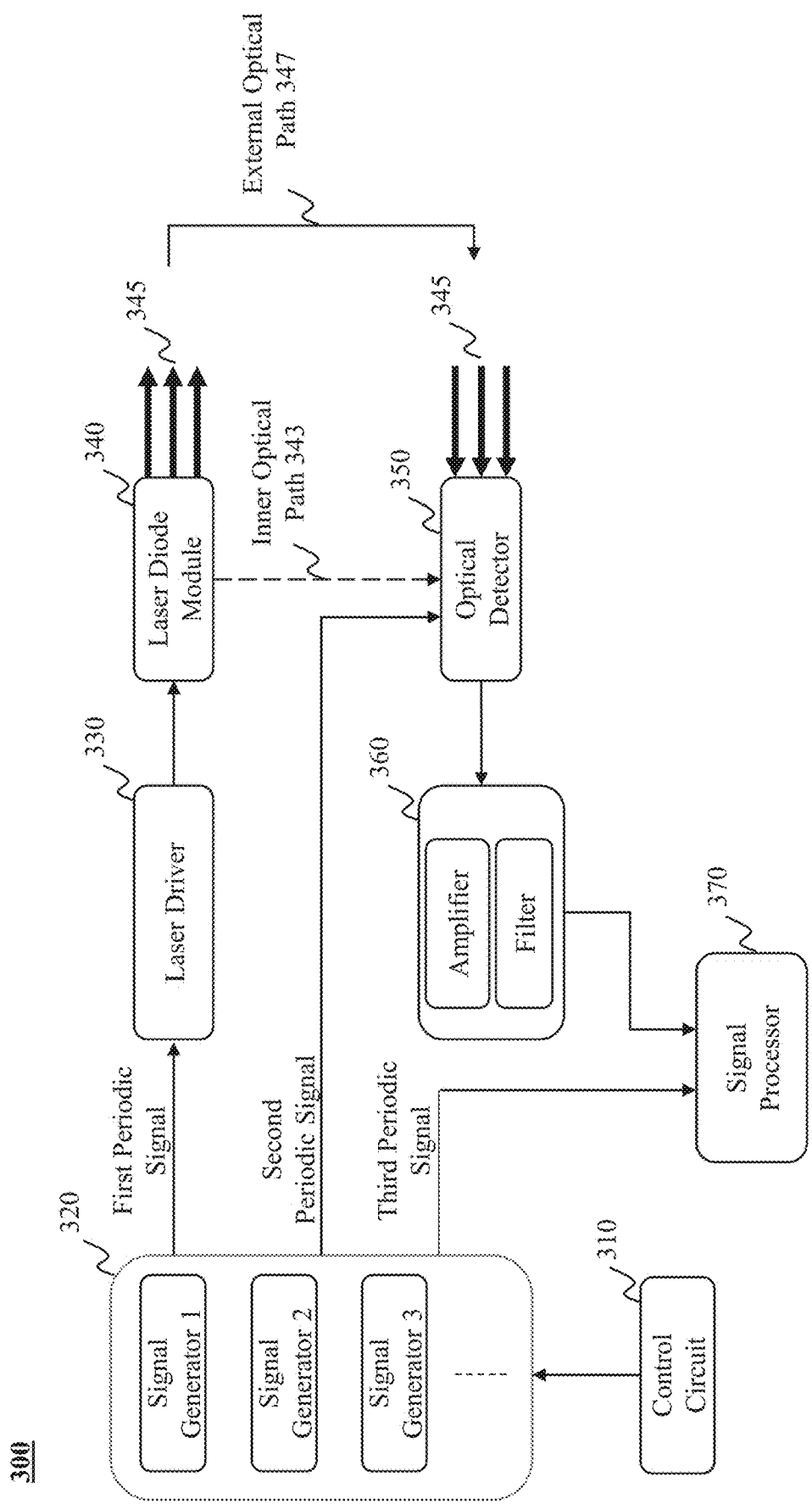
FIG. 3 is a schematic diagram illustrating an exemplary laser distance measurement device according to some embodiments of the present disclosure.

FIG. 3 is a schematic diagram illustrating an exemplary laser distance measurement device 300 according to some embodiments of the present disclosure. As shown in FIG. 3, the laser distance measurement device 300 may include a control circuit 310, a signal generation unit 320, a laser emitting device (e.g., a laser driver 330 and a laser diode module 340), an optical detector 350, a preprocessing module 360, and a signal processor 370. The connection between different components of the laser distance measurement device 300 may include a wired connection and/or a wireless connection. For example, the control circuit 310 may send a signal to the signal generation unit 320 by means of a wired transmission or a wireless transmission.

The control circuit 310 may generate a synchronization signal. In some embodiments, the synchronization signal generated by the control circuit 310 may control the signal generation unit 320 to generate a plurality of signals that have synchronous phases. As used herein, two phases are regarded as being synchronous if they are the same or have a specific phase difference. For example, the synchronization signal may trigger the signal generation unit 320 to generate a plurality of periodic signals, and the phases of the plurality of periodic signals are identical.

The signal generation unit 320 may generate a plurality of periodic signals, for example, a first periodic signal, a second periodic signal, and a third periodic signal, based on the synchronization signal. A periodic signal used herein is a signal whose waveform has a certain periodicity in the time domain. In some embodiments, according to different application scenarios, a periodic signal generated by the signal generation unit 320 may be a continuous signal whose signal strength continuously changes with time, or may be a pulse signal that appears intermittently in the time domain. In some embodiments, the signal generation unit 320 may include one or more signal generators, for example, signal generator 1, signal generator 2, signal generator 3 . . . , and signal generator N. The first periodic signal, the second periodic signal, and the third periodic signal may be generated by at least one signal generator of the signal generation unit 320. For example, the first periodic signal, the second periodic signal, and the third periodic signal may be generated by the signal generator 1, the signal generator 2, and the signal generator 3, respectively. As another example, the first periodic signal and the second periodic signal may be generated by the signal generator 1, and the third periodic signal may be generated by a signal generator other than the signal generator 1. As yet another example, the first periodic signal, the second periodic signal, and the third periodic signal may be generated by a same signal generator (e.g., the signal generator 1). As used herein, a signal generator refers to a signal source that can generate an electric signal (e.g., a pulse signal) having a particular frequency. Additionally or alternatively, the signal generator may include a component that performs post-processing on the electric signal, for example, a component that performs operations, such as, frequency division, filtering, or the like, on the electric signal. More descriptions regarding a signal generator may be found elsewhere in the present disclosure (for example, FIGS. 5-9 and relevant descriptions thereof).

The laser emitting device may generate a laser beam under the modulation of a periodic signal. For example, the laser emitting device may generate a continuous wave laser beam under modulation of a continuous signal, or generate a pulse laser beam under modulation of a pulse signal. As shown in FIG. 3, the laser driver 330 may drive the laser diode module 340 to generate a laser beam 345 according to the first periodic signal. The laser diode module 340 may emit the laser beam 345 along an external optical path 347 toward the target. The laser beam 345 may be reflected by the target and received by the optical detector 350 to form a measurement optical signal.

In some alternative embodiments, the laser beam generated by the laser diode module 340 may be divided into multiple laser beams that may be transmitted along different routes. For example, a first laser beam, i.e., the laser beam 345, may be transmitted along the first route (e.g., the external optical path 347) to form a measurement optical signal. Another laser beam may be reflected by one or more optical structures and transmitted to the optical detector 350 along a second route (e.g., an inner optical path 343) inside the laser distance measurement device 300. In some embodiments, the length of the inner optical path 343 may be known, and the optical signal transmitted along the inner optical path 343 and received by the optical detector 350 may be referred to as a reference optical signal. The measurement optical signal may be converted into a measurement signal having a low intermediate frequency by one or more signal mixing operations. The reference optical signal may be converted into a first reference signal having a low intermediate frequency by one or more signal mixing operations. In such cases, in some embodiments, the signal processor 370 may determine the distance to the target by comparing the measurement signal with the first reference signal. Additionally or alternatively, the signal processor 370 may use the third periodic signal that is synchronized with the first periodic signal as a second reference signal, and determine the distance to the target based on the combination of the measurement signal, the first reference signal, and the second reference signal. Specifically, the signal processor 370 may determine a first distance to the target according to the measurement signal and the first reference signal, and determine a second distance to the target according to the measurement signal and the second reference signal, and determine a final distance to the target according to the first distance and the second distance. For example, the signal processor 370 may determine the reliability of the measurement result by comparing the first reference signal with the second reference signal. If the phase difference between the first reference signal and the second reference signal exceeds a predetermined threshold, the signal processor 370 may determine that the measurement result is invalid.

In some embodiments, the laser driver 330 may include a DC constant current source driving circuit, an automatic power control driving circuit, or the like. In some embodiments, the laser diode module 340 may include a laser diode, a photodiode, or the like, or any combination thereof.

In some alternative embodiments, the laser distance measurement device 300 may include multiple laser emitting devices, for example, a first laser emitting device and a second emitting device. Each of the two laser emitting devices may include a laser driver 330 and a laser diode module 340 for generating a corresponding laser beam based on a same periodic signal. For example, the first laser emitting device may generate a first laser beam under the modulation of the first periodic signal, wherein the first laser beam may be transmitted along a first route (e.g., the external optical path 347) to form a measurement optical signal. The second laser emitting device may generate a second laser beam under the modulation of the first periodic signal, wherein the second laser beam may be transmitted to the optical detector 350 along a second route (e.g., the inner optical path 343) inside the laser distance measurement device 300 to form a reference optical signal. The measurement optical signal and the reference optical signal may be converted into a measurement signal and a first reference signal by one or more signal mixing operations, respectively. The measurement signal and the first reference signal may have a low intermediate frequency. In such cases, in some embodiments, the signal processor 370 may determine the distance to the target by comparing the measurement signal with the first reference signal.

The optical detector 350 may convert the received laser beam into an electric signal. In some embodiments, the optical detector 350 may receive a laser beam reflected from the target (i.e., the reflected laser beam) and perform a signal mixing process with the second periodic signal to generate a measurement signal having a low intermediate frequency. If the inner optical path 343 exists, the optical detector 350 may receive a laser beam emitted by the laser diode module 340 and transmitted along the inner optical path 343, and perform a signal mixing with the second periodic signal to generate a first reference signal having a low intermediate frequency. In some embodiments, the optical detector 350 may include one or more optical detectors. For example, if the external optical path 347 and the inner optical path 343 both exist, an optical detector may simultaneously receive two laser beams transmitted through the external optical path 347 and the inner optical path 343, and perform a signal mixing with the second periodic signal to generate a signal having a low intermediate frequency. The generated signal having a low intermediate frequency may include both the measurement signal and the first reference signal. As another example, if the external optical path 347 and the inner optical path 343 both exist, one optical detector may be configured to receive the laser beam transmitted through the external optical path 347 and perform a signal mixing with the second periodic signal to generate the measurement signal having a low intermediate frequency, and another optical detector may be configured to receive the laser beam transmitted through the inner optical path 343 and perform a signal mixing with the second periodic signal to generate the first reference signal having a low intermediate frequency. It should be noted that the present disclosure does not specifically limit the number and type of the optical detectors, and may utilize the optical detector(s) according to the actual application requirements.

In some embodiments, the optical detector 350 may be a single detector or an array detector. In some embodiments, the optical detector may include an avalanche photon diode (APD), a single photon avalanche diode, a silicon photomultiplier (MPCC), a PIN photodiode, or the like, or any combination thereof.

The preprocessing module 360 may be used to preprocess (e.g., filter, amplify, etc.) the measurement signal. In some embodiments, the preprocessing module 360 may include a signal amplifier, a low-pass filter, or the like, or any combination thereof.

The signal processor 370 may receive the preprocessed measurement signal, and determine the distance between the laser distance measurement device 300 and the target according to the third periodic signal and the preprocessed measurement signal. In some embodiments, the signal processor 370 may receive the preprocessed measurement signal and the first reference signal (e.g., the reference signal generated according to the laser beam that is transmitted through the inner optical path 343), and determine the distance between the laser distance measurement device and the target based on the preprocessed measurement signal and the first reference signal It should be noted that the above description of the laser distance measurement device 300 and its components is merely for the convenience of description and not intended to limit the scope of the present disclosure. For persons having ordinary skills in the art, after understanding the principle of the device, they may arbitrarily combine the components without departing the principle. For example, the laser driver 330 and the laser diode module 340 may be different parts of a same component or may be two individual components. As another example, the filter and the amplifier of the preprocessing module 360 may be two independent components or a single component that can perform signal amplification and signal filtering. As yet another example, the preprocessing module 360 may be integrated into the signal processor 370 to be a sub-component of the signal processor 370. As yet another example, the laser distance measurement device 300 may include two different modules, one of which may be configured for photoelectric conversion and the other one of which may be configured for signal mixing. In such cases, the optical detector 350 may be merely used to convert an optical signal (e.g., a laser beam) into an electric signal. As yet another example, a component of the laser distance measurement device 300 may be spaced apart from another component by a distance. However, those variations and modifications do not depart from the scope of the present disclosure.

Figure 4:
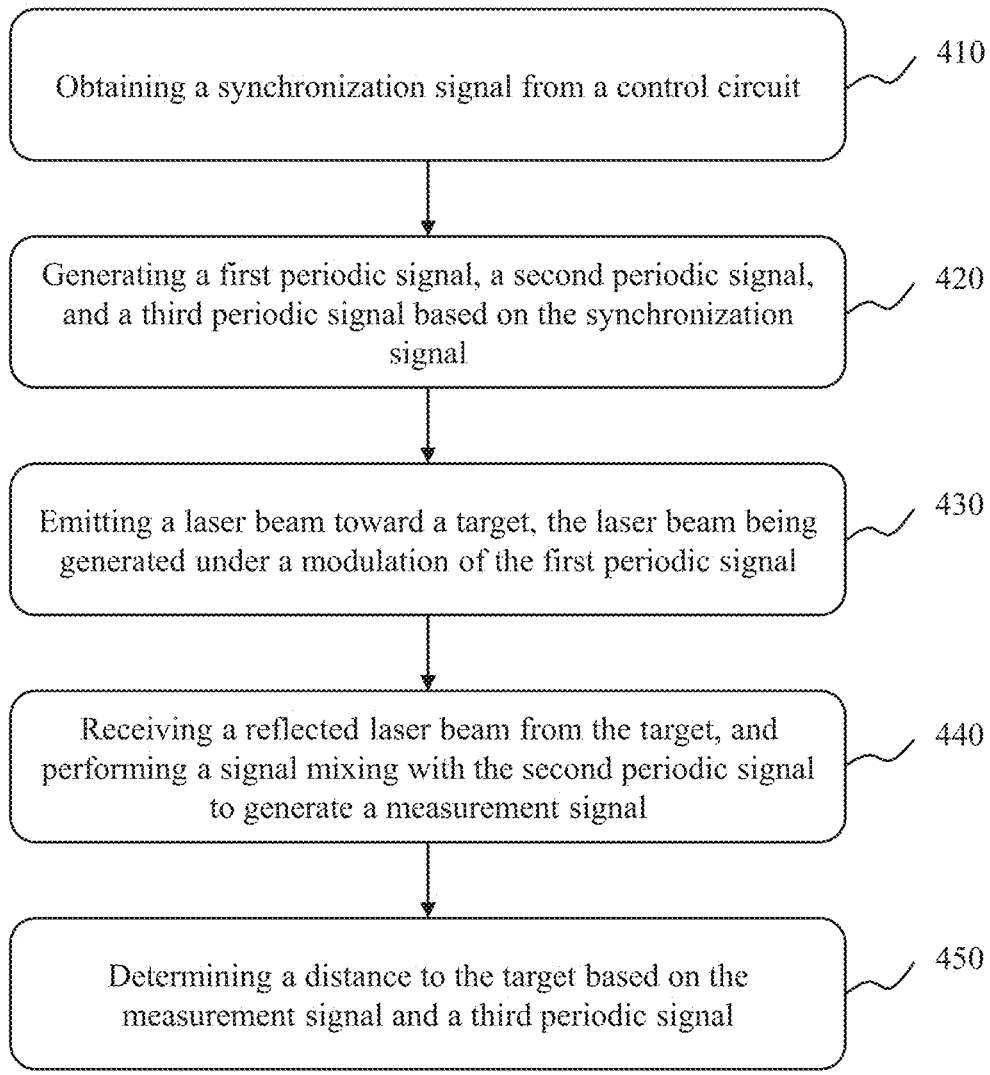
FIG. 4 is a flowchart illustrating an exemplary process for laser distance measurement according to some embodiments of the present disclosure.

FIG. 4 is an exemplary flowchart illustrating an exemplary process for laser distance measurement according to some embodiments of the present disclosure. In some embodiments, process 400 may be performed by a laser distance measurement device (e.g., the laser distance measurement device 100, the laser distance measurement device 300) disclosed in the present disclosure. The process 400 may be implemented as a set of instructions (e.g., an application) stored in a storage device (e.g., ROM or RAM). A processing device (e.g., a CPU and/or an engine) of the laser distance measurement device may execute the set of instructions. When the processing device executes the instruction, the process 400 may be performed by one or more components of the laser distance measurement device. In some embodiments, the operations of the process 400 are intended to be illustrative. The process 400 may be accomplished with one or more additional operations not described and/or without one or more of the operations herein discussed. Additionally, the order in which the operations of the process 400 described above is not intended to be limiting. For illustration purposes, the implementation of the process 400 by the laser distance measurement device 300 is described hereinafter as an example.

In 410, a synchronization signal is generated by the control circuit 310.

As used herein, a synchronizing signal refers to a signal for providing a same (time) reference to components that need to process information or data synchronously. For example, the synchronization signal may be used to control one or more signal generators of the signal generation unit 320 to generate multiple synchronous signals. Merely by way of example, the signal generator 1 may generate one or more clock signals whose phases are synchronized with the synchronization signal by adjusting the phase time of each clock signal with respect to the synchronization signal. A phase time (or referred to as a phase for brevity) of a clock signal refers to a delay time of the clock signal with respect to the synchronization signal at a specific moment (e.g., a rising edge or a falling edge of the synchronization signal). In some embodiments, a phase synchronization between multiple signals may refer to that the phases of the signals are identical or have a particular phase difference. For example, the signal generation unit 320 may generate multiple signals at the same time. If the rising edges and/or falling edges of the multiple signals are exactly the same, the multiple signals may achieve a complete phase synchronization. If the delay time between the rising edges and/or the falling edges of the multiple signals remains unchanged, the multiple signals may have a fixed phase difference between them. For example, the phase delay time between the signals may be 5 nanoseconds, 10 nanoseconds, 0.1 microseconds, 0.5 microseconds, or the like.

In some embodiments, the synchronization signal may be a periodic signal of various shapes, such as a sine wave signal, a sawtooth wave signal, a rectangular waveform (for example, a square wave) signal, and a triangular wave signal, or the like. In some embodiments, the control circuit 310 may include one or more signal generation components and/or software programs that may generate a particular type of synchronization signal by setting a signal parameter. For example, the control circuit 310 may include a MATLAB software for generating a signal, a sinusoidal signal generator, a function generator, a pulse signal generator, a high frequency signal generator, a low frequency signal generator, or the like, or any combination thereof.

In 420, the signal generation unit 320 may generate a first periodic signal, a second periodic signal, and a third periodic signal based on the synchronization signal.

A periodic signal used herein may be a signal whose waveform has a certain periodicity in the time domain. For example, the periodic signal may be a sine wave signal, a pulse signal (such as a sawtooth wave signal, a square wave signal, a triangular wave signal), or the like. In some embodiments, the first periodic signal, the second periodic signal, and the third periodic signal may be generated by a same signal generator of the signal generation unit 320. Alternatively, at least two of the first periodic signal, the second periodic signal, and the third periodic signal may be generated by different signal generators of the signal generation unit 320. For example, the first periodic signal and the second periodic signal may be generated by the signal generator 1 (also be referred to as a first signal generator), and the third periodic signal may be generated by the signal generator 2 (also be referred to as a second signal generator). As another example, the first periodic signal may be generated by the signal generator 1, the second periodic signal may be generated by the signal generator 2, and the third periodic signal may be generated by the signal generator 3 (also be referred to as a third signal generator).

In some embodiments, based on the synchronization signal, the laser distance measurement device 300 may control the signal generation unit 320 to generate the first periodic signal, the second periodic signal, and the third periodic signal that have synchronous phases. For example, the signal generation unit 320 may adjust the phase time between the synchronization signal and each of the first periodic signal, the second periodic signal, and the third periodic signal to achieve phase synchronization between the first periodic signal, the second periodic signal, and the third periodic signal. For example, the signal generation unit 320 may adjust the phase time between the synchronization signal and each of the first periodic signal, the second periodic signal, and the third periodic signal, so that the rising edge (or falling edge) of each of the first periodic signal, the second periodic signal, and the third periodic signal is identical to the rising edge (or falling edge) of the synchronization signal. In such cases, the phases of the first periodic signal, the second periodic signal, and the third periodic signal may be completely synchronous. As another example, the signal generation unit 320 may adjust the phase time between the synchronization signal and each of the first periodic signal, the second periodic signal, and the third periodic signal, so that the delay time between the rising edges (or falling edges) of the first periodic signal and the synchronization signal may be equal to that of the second periodic signal and the synchronization signal (e.g., both are equal to 5 nanoseconds), and the delay time between the rising edges (or falling edges) of the third periodic signal and the synchronization signal remain unchanged (e.g., 10 nanoseconds). In such cases, there may be a fixed phase difference between the third periodic signal and each of the first periodic signal and the second periodic signal. When the first periodic signal, the second periodic signal, and the third periodic signal are generated based on the synchronization signal, the phase differences between the first periodic signal, the second periodic signal, and the third periodic signal may be known (e.g., the phase difference may be 0). In the subsequent measurement process, when the phase of the first periodic signal changes (e.g., due to that the laser beam corresponding to the first periodic signal propagates between the laser measurement device and the object to be measured), the phase of the third periodic signal can be taken as a reference signal because the third periodic signal is synchronized with the first periodic signal initially and the phase of the third periodic signal can be regarded as the phase of the initial first periodic signal before the phase change. Therefore, the phase change of the first period signal phase and its corresponding measurement distance can be directly calculated to improve the measurement accuracy. Specifically, in the laser measurement process, the laser beam generated under the modulation of the first periodic signal may have an unchanged frequency but a shifted phase after being reflected by the target. Then, the reflected laser beam may be mixed with the second periodic signal. The phase shift of the measurement signal obtained by the mixing operation remains unchanged. Therefore, since the phase of the initial first periodic signal is synchronized with the phase of the third periodic signal, by calculating the phase difference between the measurement signal and the third periodic signal, the distance can be easily measured and the accuracy can be improved.

In some embodiments, the signal generation unit 320 may include one or more signal generators for generating a periodic signal. For example, the signal generation unit 320 may include a phase-locked loop, an RC oscillator circuit, an LC oscillator circuit, an astable multivibrator, a Wien bridge oscillator, a beat frequency oscillator, a function generator, or the like, or any combination thereof. Details regarding a signal generator may be found elsewhere in the present disclosure (e.g., FIGS. 5-9 and the relevant descriptions thereof).

In some embodiments, the first periodic signal and the second periodic signal may be high frequency signals, and the frequencies of the two signals may be close to each other (e.g., the difference between the frequencies is less than a threshold frequency). The third periodic signal may be a low intermediate frequency signal, and the frequency of the third periodic signal may be equal to the difference between the frequencies of the first periodic signal and the second periodic signal. In the present disclosure, a high frequency signal may refer to a signal whose frequency exceeds a first frequency threshold, and a low intermediate frequency signal may refer to a signal whose frequency is lower than a second frequency threshold. The first frequency threshold and the second frequency threshold may be any values. The first frequency threshold and the second frequency threshold may be the same or different. For example, the frequency of the first periodic signal may be 5 MHz, the frequency of the second periodic signal may be 4.999 MHz, and the frequency of the third periodic signal may be 1 KHz. In some embodiments, the first periodic signal may be used to modulate the strength of a laser signal emitted by the laser emitting device 300. The laser signal may be emitted toward a target and then reflected by the target. The reflected laser signal may be received by the optical detector 350 to generate a measurement signal. The measurement signal may be a low intermediate frequency signal generated by performing a frequency conversion on the reflected laser signal. The third periodic signal may be compared with the measurement signal to determine the distance from the laser distance measurement device 300 to the target. As used herein, the first periodic signal corresponds to the laser signal emitted by the laser distance measurement device 300, the second periodic signal may be also referred to as a local oscillator signal, and the third periodic signal may be also referred to as a reference signal (for example, similar to the second reference signal aforementioned). What needs to be known is that in the occasion where the first periodic signal, the second periodic signal, and the third periodic signal are used for laser measurement, when the frequency of the third periodic signal is equal to the difference between the frequencies of the first periodic signal and the second periodic signal, it can simplify the calculation process of measurement and provide more accurate measurement results. Specifically, the first periodic signal may be used to modulate the laser diode module to generate a laser beam that transmits to the target to be measured. The laser beam reflected by the target may be mixed with the second periodic signal to generate the measurement signal. The third periodic signal may be used to compare with the measurement signal to calculate the distance from the measurement device to the target to be measured. It shall be noted that after the laser beam reflected by the target is mixed with the second periodic signal, the frequency of the generated measurement signal is equal to the difference between the frequency of the first periodic signal and the frequency of the second periodic signal. When using the frequency divider to generate the third periodic signal, the frequency of the third periodic signal may be set to be equal to the difference between the frequencies of the first periodic signal and the second periodic signal, that is, the frequency of the third periodic signal is the same as the frequency of the measurement signal. Then, the phase difference between the third period signal and the measurement signal may directly reflect the phase change caused by the propagation of the measurement signal between the laser measurement device and the object to be measured, so that the distance from the measurement device to the target to be measured can be directly calculated. Moreover, in the calculation process, there is no problem of comparing signals of different frequencies with each other, so the final measurement results can be more accurate.

It shall be noted that using the first periodic signal, the second periodic signal, and the third periodic signal to perform laser measurement can simplify the structure of the measurement device, reduce the difficulty of signal processing, reduce additional circuit interference, and improve measurement accuracy. For example, by directly using the third periodic signal as the reference signal in the laser measurement, it can avoid adding an additional circuit or light path that uses the laser signal (corresponding to the first periodic signal) and the local oscillator signal (i.e., the second periodic signal) to generate a low-frequency reference signal, which simplifies the structure of the measurement device and reduces the circuit interference. As another example, the operation that the optical detector receives the laser signal reflected by the target and converts it into an electrical signal by mixing with the second periodic signal to generate a low-frequency measurement signal may reduce the difficulty of signal processing.

In 430, the laser emitting device may emit a laser beam toward the target, wherein the laser beam may be generated under the modulation of the first periodic signal.

In some embodiments, the first periodic signal may modulate the strength of the laser beam generated by the laser emitting device at a stable frequency. For example, under the modulation of the first periodic signal, the laser emitting device may determine the brightness, the darkness, and the brightness change rate of the laser beam based on the amplitude and the variation of the first periodic signal, thereby generating the laser beam. In some embodiments, the laser emitting device may include the laser driver 330 and the laser diode module 340. The laser driver 330 may be used to drive the laser diode module 340 to emit a laser beam. For example, the laser driver 330 may output a current above a threshold level to the laser diode module 340 to drive the laser diode module 340 to generate a laser beam and emit the laser beam toward the target. The laser driver 330 may include any driving circuit, such as a DC constant current source driving circuit or an automatic power control driving circuit. The laser diode module 340 may include, for example, a laser diode, a photodiode, or any element that may emit a laser, or any combination thereof.

In 440, the optical detector 350 may receive a laser beam reflected from the target (also referred to as "reflected laser beam") and perform a signal mixing process with the second periodic signal to generate a measurement signal.

The laser beam emitted by the laser emitting device may be reflected by the target and transmitted to the optical detector 350. The optical detector 350 may convert the received laser beam into an electric signal and perform the signal mixing process with the second periodic signal to generate the measurement signal. In some embodiments, the optical detector 350 may include an avalanche photon diode (APD), a single photon avalanche diode (Single Photon Avalanche Diode), a silicon photomultiplier tube (MPCC), a PIN photodiode, or the like, or any combination thereof.

In some embodiments, the measurement signal may be a low intermediate frequency signal. As described above, the first periodic signal may be a high frequency signal, and the electric signal generated based on the reflected laser beam may still be a high frequency signal. A high frequency signal may be difficult to be processed, and may cause a large amount of computation and long processing time. Therefore, it may be desired to convert the high frequency signal to a low intermediate frequency signal in order to reduce the calculation amount and improve the measurement accuracy. The frequency of the second periodic signal may be close to the frequency of the first periodic signal, and the high frequency signal may be converted into a low intermediate frequency signal by a signal mixing process with the second periodic signal on the optical detector 350. For example, it may be assumed that the frequency of the first periodic signal generated by the signal generation unit 320 is 5 MHz, and the frequency of the second periodic signal is 4.999 MHz. The laser beam generated under the modulation of the first periodic signal may be reflected by the target and transmitted to the optical detector 350. The optical detector 350 may perform the signal mixing between the received reflected laser beam with the second periodic signal to generate a measurement signal having a frequency of 1 kHz (i.e., a low intermediate frequency).

In some alternative embodiments, the optical detector 350 may convert the received reflected laser beam into an electric signal. The laser distance measurement device 300 may be connected to a signal mixing unit for receiving the electric signal from the optical detector 350 and perform a signal mixing process with the second periodic signal to further generate a low intermediate frequency measurement signal. In some other alternative embodiments, the laser distance measurement device 300 may convert the high frequency signal to a low intermediate frequency signal in any other suitable manner (e.g., using a low pass filter), which is not limited in the present disclosure. In some embodiments, the laser distance measurement device 300 may further perform post-processing (e.g., frequency selective amplification, low-pass filtering) on the measurement signal, in order to improve the quality of the measurement signal.

In 450, the signal processor 370 may determine the distance from the laser distance measurement device 300 to the target based on the measurement signal and the third periodic signal.

The laser beam may be transmitted to and reflected by the target, during which a phase shift may occur. The phase of the third periodic signal may be synchronized with the phases of the first periodic signal and the second periodic signal, and thus the third periodic signal may be used as a reference signal of the measurement signal. The distance information of the target may be obtained by comparing the phases of the measurement signal and the third periodic signal.

For example, the frequency of the first periodic signal may be 5 MHz, the frequency of the second periodic signal may be 4.999 MHz, and the frequency of the third periodic signal may be 1 KHz. The frequency of the measurement signal may be equal to the frequency difference between the reflected laser beam and the second periodic signal, that is, 1 kHz. If the phases of the first periodic signal, the second periodic signal, and the third periodic signal are $\varphi_1$, the phase of the measurement signal is $\varphi_2$, the distance between the laser distance measurement device 300 and the target may be determined based on the phase difference between the measurement signal and the third periodic signal in the same period. For example, the distance between the laser distance measurement device 300 and the target may be determined based on Equation (1) as below:

$$L = \frac{1}{2} * c * \frac{\varphi}{2\pi}, \quad (1)$$

where L refers to the distance from the laser distance measurement device 300 to the target, and c refers to the speed of light, <p refers to the phase difference between the measurement signal and the reference signal (i.e., the third periodic signal) in the same period, i.e., ($\varphi_2-\varphi_1$).

In some embodiments, the laser distance measurement device 300 may acquire a synchronization signal from the control circuit 310, and the signal generation unit 320 may generate a first pulse signal, a second pulse signal, and a third pulse signal based on the synchronization signal. The laser emitting device (e.g., the laser driver 330 and the laser diode module 340) may generate a laser beam 345 under the modulation of the first pulse signal and transmit the laser beam 345 to the target along the external optical path 347. The laser beam 345 may be reflected by the target and transmitted to the optical detector 350. The optical detector 350 may convert the reflected laser signal into an electric signal and perform a signal mixing with the second pulse signal to generate the measurement signal. The signal processor 370 may then determine the distance from the laser distance measurement device 300 to the target based on the measurement signal and the third pulse signal.

In some embodiments, the laser distance measurement device 300 may acquire a synchronization signal from the control circuit 310, and the signal generation unit 320 may generate a first pulse signal, a second pulse signal, and a third pulse signal based on the synchronization signal. A first laser emitting device may generate a first laser beam (e.g., the laser beam 345 in FIG. 3) under the modulation of the first pulse signal, and emit the first laser beam toward the target along a first route (e.g., the external optical path 347 in FIG. 3). The first laser beam may be reflected by the target and transmitted to the optical detector 1. The optical detector 1 may convert the reflected laser signal into an electric signal and perform a signal mixing with the second pulse signal to generate a low intermediate frequency measurement signal. A second laser emitting device may generate a second laser beam under the modulation of the first pulse signal, and transmit the second laser beam to the optical detector 2 along a second route (e.g., the inner optical path 343 in FIG. 3). The optical detector 2 may convert the received laser signal into an electric signal and perform a signal mixing with the second pulse signal to generate a low intermediate frequency reference signal (first reference signal). The signal processor 370 may use the third pulse signal as a second reference signal, determine a first distance to the target according to the measurement signal and the first reference signal, and determine a second distance to the target according to the measurement signal and the second reference signal, and determine a final distance to the target based on the first distance and the second distance.

It should be noted that the above description of the process 400 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, in 420, the laser distance measurement device may perform phase synchronization on the first periodic signal, the second periodic signal, and the third periodic signal by adjusting the phase difference between each pair of signals of the first periodic signal, the second periodic signal, and the third periodic signal. As another example, in 420, the laser distance measurement device may generate two synchronous signals (e.g., a first periodic signal and a second periodic signal) based on the synchronization signal. The laser distance measurement device may divide the laser beam generated under the modulation of the first periodic signal into two groups according to a predetermined ratio (e.g., 1:2, 1:1, 2:5, etc.). One group may serve as a measurement optical signal and be transmitted along the external optical path, and the other group may serve as a reference optical signal and be transmitted along the inner optical path. As another example, in 440, the optical detector may first convert the received optical signal reflected by the target into an electric signal, and then a low-pass filter may perform frequency filtering on the electric signal to generate the measurement signal.

FIGS. 5-8 are schematic diagrams illustrating exemplary signal generation units according to some embodiments of the present disclosure.

In some embodiments, the signal generation unit may include one or more signal generators. A signal generator may include a signal source for generating a periodic signal. For brevity, the periodic signal generated by a signal source may be referred to as a source signal. For example, a phase-locked loop and an RC oscillator circuit may serve as two different types of signal sources, which may be used to generate source signals of different frequencies. As another example, two or more phase-locked loops may be used as a same type of signal source to generate source signals of a same frequency or different frequencies. As used herein, two signal sources may be deemed as being of a same type if they include same or similar electronic component(s). Two signal sources may be deemed as being of different types if they include at least one different electronic component.

Additionally, a signal generator may further include one or more frequency dividers (or down converters, such as a low pass filter) for dividing (or down-converting) the generated source signal(s) to generate one or more periodic signals having expected frequencies. For example, if the frequency of a source signal generated by a signal source is 20 MHz and the frequency division coefficient of the frequency divider is 4, the frequency of a periodic signal outputted by the frequency divider may be 5 MHz. In some embodiments, a plurality of frequency dividers may be used to divide a same source signal or different source signals. The count of signal sources, the frequency of a source signal, and the frequency division coefficient of a frequency divider may be determined according to actual requirements. In some embodiments, a frequency divider may include a frequency division unit and/or a sub-signal source. For example, the frequency divider may be a simple frequency divider for frequency division. As another example, the frequency divider may include a complex frequency divider including a sub-signal source (e.g., a phase-locked loop, an RC oscillator circuit, etc.) for signal generation and a sub-frequency divider for frequency division.

Figure 5:
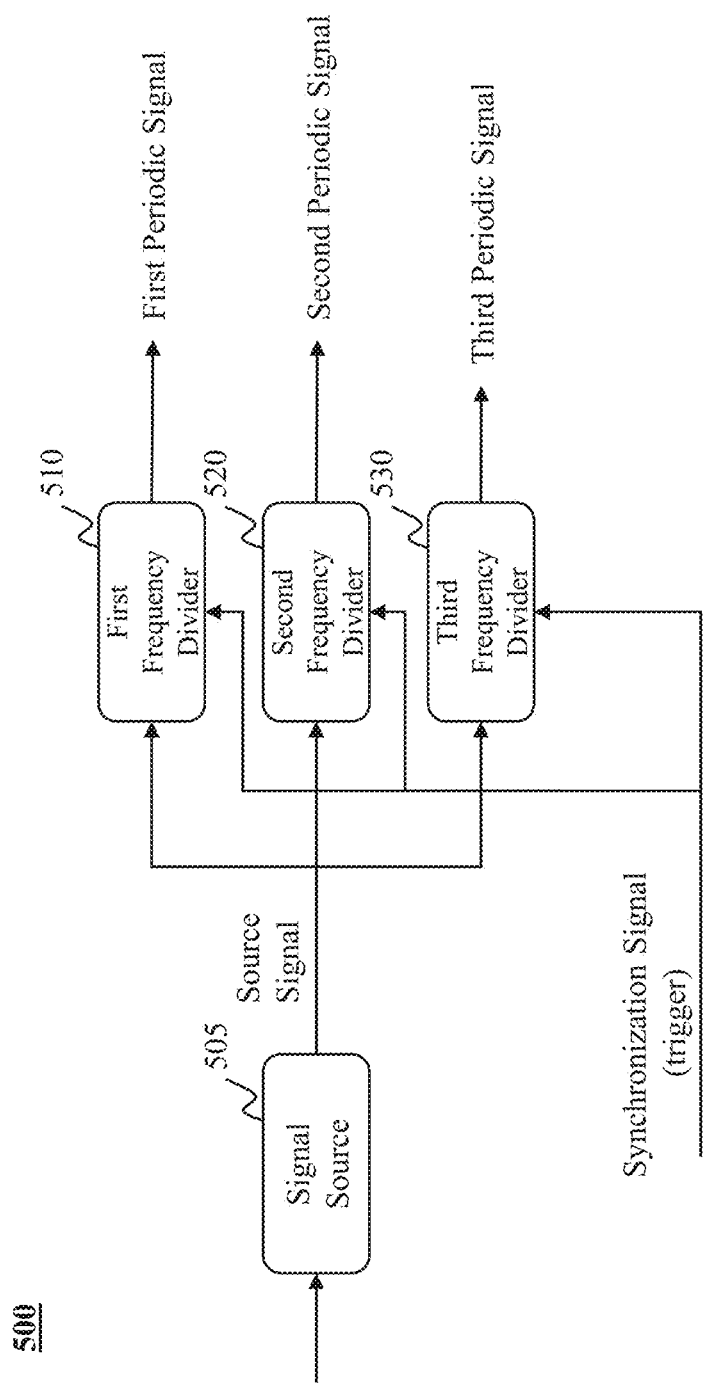
FIGS. 5-8 are schematic diagrams illustrating exemplary signal generation units according to some embodiments of the present disclosure.

As shown in FIG. 5, the signal generation unit 500 may include a signal source 505 and three frequency dividers 510, 520, and 530. The signal source 505 may generate a source signal (e.g., a pulse source signal) having a specific frequency. The signal source 505 may include any component that may generate a periodic signal, such as a phase-locked loop, an RC oscillator circuit, or the like. Each of the first frequency divider 510, the second frequency divider 520, and the third frequency divider 530 may divide the source signal output by the signal source 505 to generate a periodic signal. For example, the first frequency divider 510, the second frequency divider 520, and the third frequency divider 530 may generate the first periodic signal, the second periodic signal, and the third periodic signal as described above, respectively. In some embodiments, the first frequency divider 510, the second frequency divider 520, and the third frequency divider 530 may have different frequency division coefficients. Additionally or alternatively, at least one of the first frequency divider 510, the second frequency divider 520, and the third frequency divider 530 may be a decimal frequency divider. For example, assuming that the frequency of the source signal may be 20 MHz, the frequency division coefficient of the second frequency divider 520 may be a decimal such that the frequency of the second periodic signal generated by the second frequency divider 520 may be 4.999 MHz. In some embodiments, the frequency division coefficients of the first frequency divider 510, the second frequency divider 520, and the third frequency divider 530 may be set according to actual requirements.

In the signal generation unit 500, the synchronization signal may simultaneously control the first frequency divider 510, the second frequency divider 520, and the third frequency divider 530 to divide the source signal, thereby obtaining three periodic signals having synchronous phases.

Figure 6:
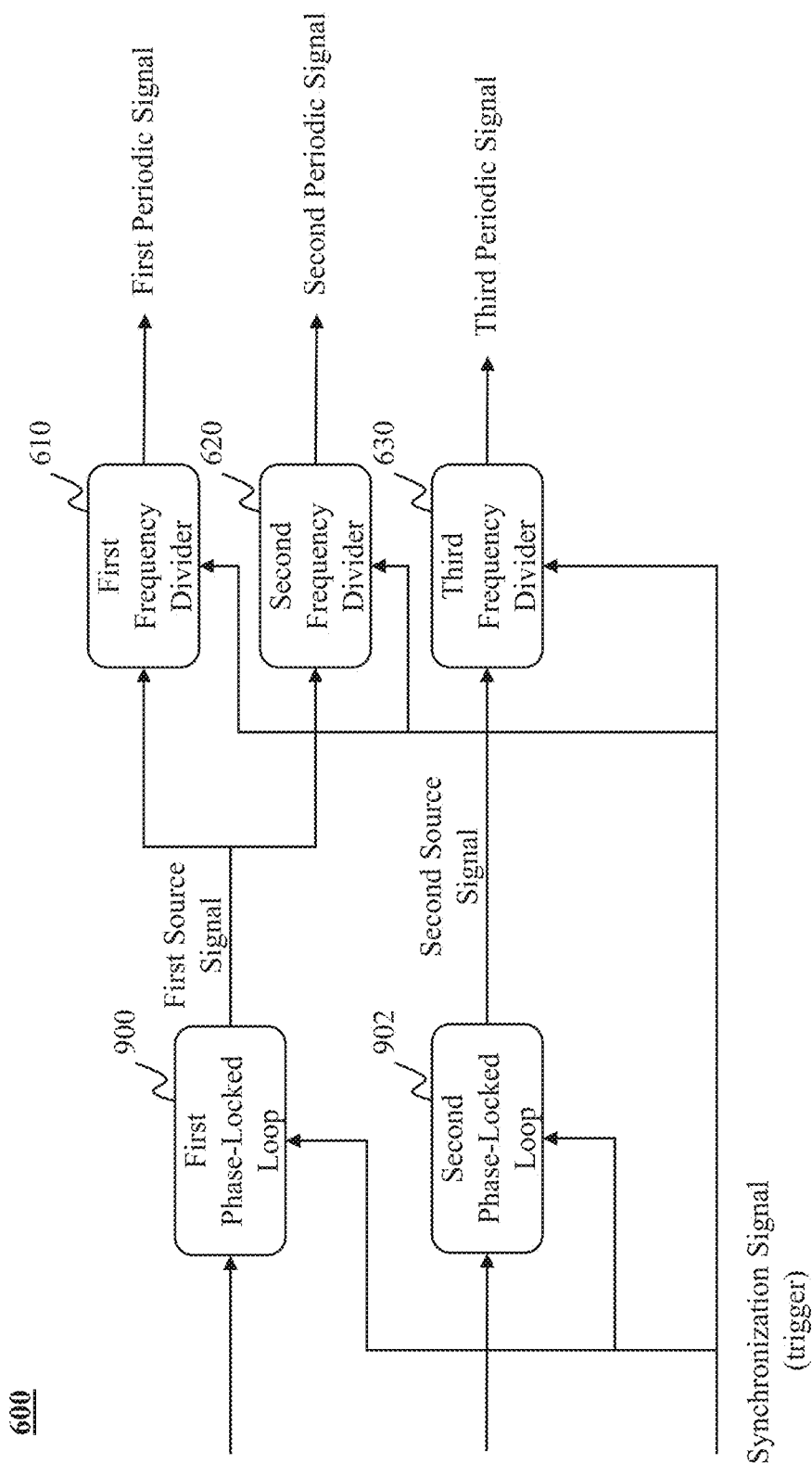

As shown in FIG. 6, the signal generation unit 600 may include two signal sources of the same type (i.e., a first phase-locked loop 900 and a second first phase-locked loop 902) and three frequency dividers (i.e., a first frequency divider 610, a second frequency divider 620, and a third frequency divider 630). The first phase-locked loop 900, the first frequency divider 610, and the second frequency divider 620 may forma first signal generator (e.g., the signal generator 1). The second phase-locked loop 902 and the third frequency divider 630 may form a second signal generator (e.g., the signal generator 2). The first phase-locked loop 900 may generate a first source signal. The first frequency divider 610 and the second frequency divider 620 may perform frequency division on the first source signal to generate, for example, a first periodic signal and a second periodic signal, respectively. The second phase-locked loop 902 may generate a second source signal, and the third frequency divider 630 may perform frequency division on the second source signal to generate, for example, a third periodic signal.

In some embodiments, the first source signal and the second source signal may be periodic signals having a same shape or similar shapes. For example, the first source signal and the second source signal may be triangular wave pulse signals. In some embodiments, the first source signal and the second source signal may have a same signal parameter (e.g., period, amplitude, phase, etc.). In some embodiments, the first source signal and the second source signal may have different signal parameters. For example, the first source signal may be a triangular wave signal with a high frequency (e.g., 100 MHz), and the second source signal may be a triangular wave signal with a low frequency (e.g., 1 MHz). In some embodiments, the first frequency divider 610, the second frequency divider 620, and the third frequency divider 630 may be frequency dividers having different frequency division coefficients. Each of the first frequency divider 610, the second frequency divider 620, and the third frequency divider 630 may be a decimal frequency divider or an integer frequency divider having a certain frequency division coefficient. For example, the first frequency divider 610 may have a frequency division coefficient of 2, the second frequency divider 620 may have a frequency division coefficient of 4, and the third frequency divider 630 may have a frequency division coefficient of 10. As another example, the first frequency divider 610 may have a frequency division coefficient of 1.5, the second frequency divider 620 may have a frequency division coefficient of 1.3, and the third frequency divider 630 may have a frequency division coefficient of 3.

In the signal generation unit 600, the synchronization signal may control the signal sources and the frequency dividers of the signal generators (e.g., the first signal generator and the second signal generator). For example, the synchronization signal may simultaneously control the first phase-locked loop 900 and the second phase-locked loop 902 to generate the first source signal and the second source signal having synchronous phases. The synchronization signal may also control the first frequency divider 610, the second frequency divider 620, and the third frequency divider 630 to divide the first source signal and the second source signal to obtain three periodic signals having synchronous phases. In some alternative embodiments, different synchronization signals may be used for controlling the signal sources and the frequency dividers. The different synchronization signals may be generated by a same control circuit (for example, the control circuit 310) or different control circuits.

Figure 7:
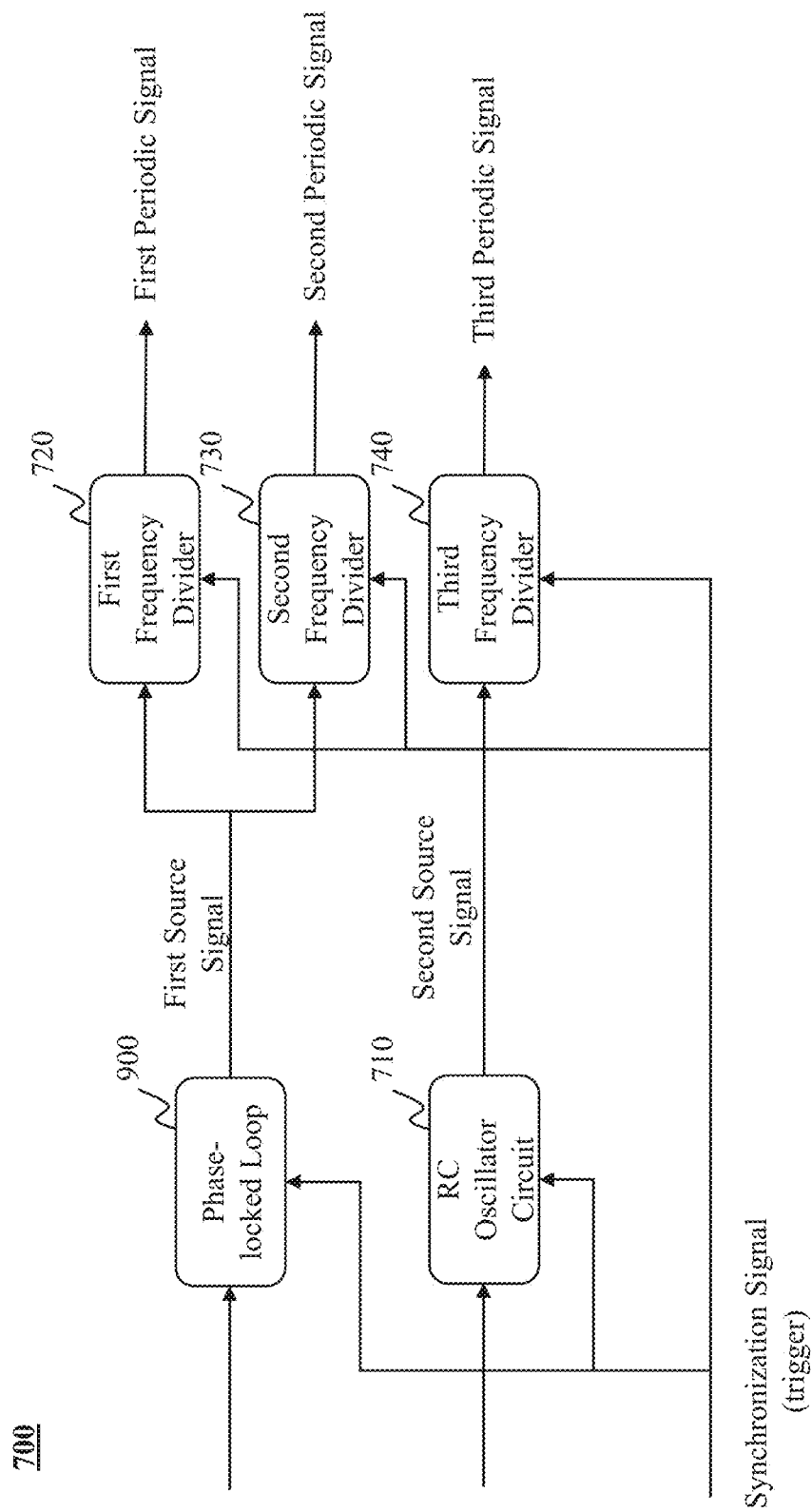

As shown in FIG. 7, the signal generation unit 700 may include two different types of signal sources (i.e., a phase-locked loop 900 and an RC oscillator circuit 710) and three frequency dividers (i.e., a first frequency divider 710, a second frequency divider 720, and a third frequency divider 730).

In such cases, the signal generation unit 700 may include two signal generators, one of which includes the phase-locked loop 900 as a signal source and the other one of which includes the RC oscillator circuit 710 as a signal source. The phase-locked loop 900, the first frequency divider 720, and the second frequency divider 730 may form a first signal generator (e.g., the signal generator 1). The RC oscillator circuit 710 and the third frequency divider 740 may form a second signal generator (e.g., the signal generator 2). The phase-locked loop 900 may generate a first source signal. The first frequency divider 720 and the second frequency divider 730 may perform frequency division on the first source signal to generate, for example, a first periodic signal and a second periodic signal, respectively. The RC oscillator circuit 710 may generate a second source signal, and the third frequency divider 740 may perform frequency division on the second source signal to generate, for example, a third periodic signal.

In the signal generation unit 700, the synchronization signal may control the signal sources and the frequency dividers of the signal generators (e.g., the first signal generator and the second signal generator). For example, the synchronization signal may simultaneously control the phase-locked loop 900 and the RC oscillator circuit 710 to generate the first source signal and the second source signal having synchronous phases. The synchronization signal may also control the first frequency divider 720 and the second frequency divider 730 to perform frequency division on the first source signal, and control the third frequency divider 740 to perform frequency division on the second source signal, thereby generating three periodic signals having synchronous phases. In some alternative embodiments, different synchronization signals may be used for controlling the signal sources and the frequency dividers.

It should be noted that the signal sources provided in FIG. 6 and FIG. 7 are for illustration purposes only, and may be replaced by any other type of signal source or combination of signal sources. For example, a signal source may be replaced by one or more of an LC oscillator circuit, an astable multivibrator, a Wien-bridge oscillator, a difference frequency oscillator, a function generator, or the like.

Figure 8:
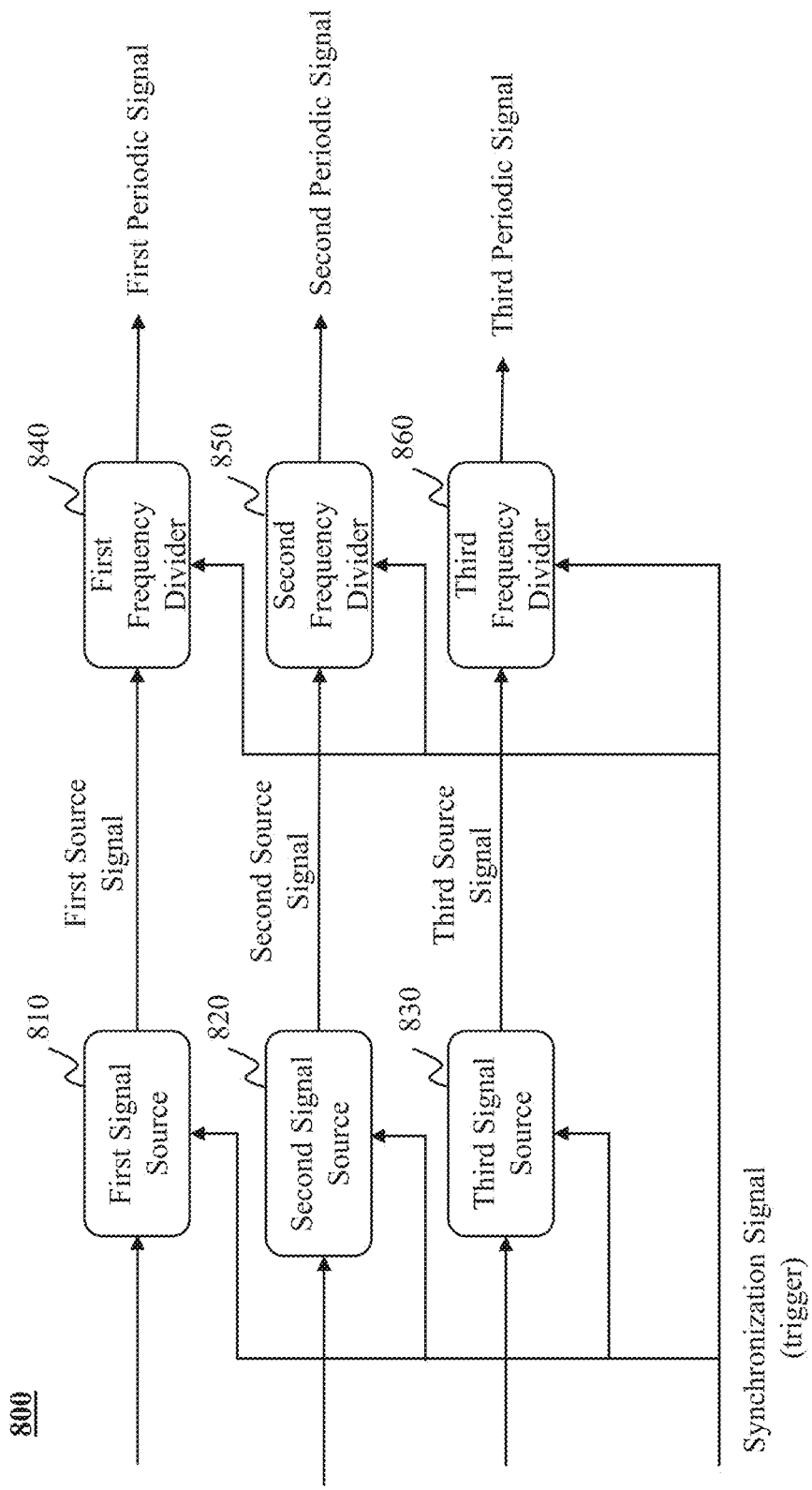

As shown in FIG. 8, the signal generation unit 800 may include three signal sources (i.e., a first signal source 810, a second signal source 820, and a third signal source 830) and three frequency dividers (i.e., a first frequency divider 840, a second frequency divider 850, and a third frequency divider 860). In such cases, the signal generation unit 800 may include three signal generators. The first signal source 810 and the first frequency divider 840 may form a first signal generator (e.g., the signal generator 1). The second signal source 820 and the second frequency divider 850 may form a second signal generator (e.g., the signal generator 2). The third signal source 830 and the third frequency divider 860 may form a third signal generator (e.g., the signal generator 3). The first source 810 may generate a first source signal, and the first frequency divider 840 may perform frequency division on the first source signal to generate, for example, a first periodic signal. The second source 820 may generate a second source signal, and the second frequency divider 850 may perform frequency division on the second source signal to generate, for example, a second periodic signal. The third source 830 may generate a third source signal, and the third frequency divider 860 may perform frequency division on the third source signal to generate, for example, a third periodic signal.

In some embodiments, the first source signal, the second source signal, and the third source signal may be periodic signals having a same shape or similar shapes. For example, the first source signal, the second source signal, and the third source signal may be sawtooth pulse signals. In some embodiments, at least two of the first source signal, the second source signal, and the third source signal may have a same signal parameter (e.g., period, amplitude, phase, etc.). For example, the first source signal and the second source signal may both be pulse signals with a high frequency (e.g., 100 MHz), and the third source signal may be a pulse signal with a low intermediate frequency (e.g., 10 kHz). In some embodiments, the types of the signal sources 810, 820, and 830 may be the same as, or partially or completely different from each other. For example, the first signal source 810, the second signal source 820, and the third signal source 830 may be phase-locked loops. As another example, the first signal source 810 and the second signal source 820 may be phase-locked loops, and the third signal source 830 may be an RC oscillator circuit. As another example, the first signal source 810 may be a phase-locked loop, the second signal source 820 may be an LC oscillator circuit, and the third signal source 830 may be an RC oscillator circuit. It should be noted that the above description of the three signal sources is for illustration purposes only, and not intended to be limiting. For example, one or more of the three sources may be replaced by one or more one or more of an LC oscillator circuit, an astable multivibrator, a Wien-bridge oscillator, a difference frequency oscillator, a function generator, or the like.

In the signal generation unit 800, the synchronization signal may control the signal sources and the frequency dividers of the three signal generators (e.g., the first signal generator, the second signal generator, and the third signal generator). For example, the synchronization signal may control the signal sources 810, 820, and 830 to generate a first source signal, a second source signal, and a third source signal, respectively. The synchronization signal may also control the first frequency divider 840, the second frequency divider 850, and the third frequency divider 860 to perform frequency division on the first source signal, the second source signal, and the third source signal, respectively, thereby generating three periodic signals (e.g., the first, second, and third periodic signals) having synchronous phases. In some alternative embodiments, different synchronization signals may be used for controlling the signal sources and the frequency dividers. The different synchronization signals may be generated by a same control circuit (for example, the control circuit 310) or different control circuits.

It should be noted that the above description of the signal generation unit is merely provided for illustration purposes and does not limit the scope of the present disclosure. For those skilled in the art, after understanding the principles of the device, they may arbitrarily combine the various components or replace a component with another component without departing from the principle. For example, the signal generation unit may use a different signal source (e.g., an LC oscillator circuit) instead of a phase-locked loop or an RC oscillator circuit to generate a source signal. As another example, one or more frequency dividers may be omitted in the signal generation unit 320. The frequency of a source signal (e.g., the second phase-locked loop 902, the RC oscillator circuit 710) may be directly equal to the frequency of the third periodic signal. For example, the RC oscillator circuit 710 may generate a sine wave having the same low intermediate frequency as the third periodic signal to be generated, and directly output the sine wave as the third periodic signal after a waveform conversion.

Figure 9:
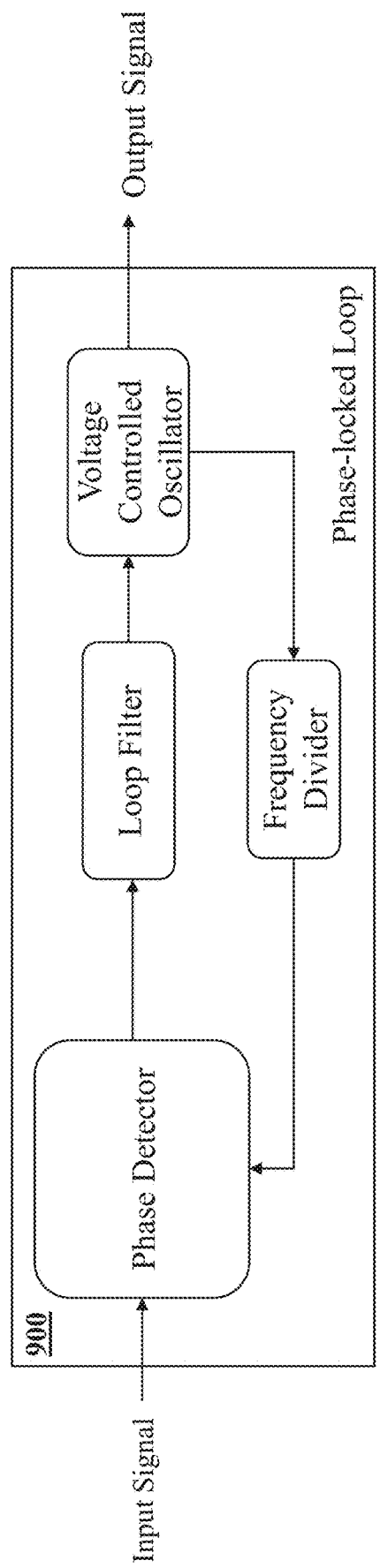
FIG. 9 is a schematic diagram illustrating an exemplary phase-locked loop structure according to some embodiments of the present disclosure.

FIG. 9 is a schematic diagram illustrating an exemplary phase-locked loop structure according to some embodiments of the present disclosure. The phase-locked loop may be a feedback control circuit and used to synchronize an external input signal with an internal oscillator signal. As shown in FIG. 9, the phase-locked loop 900 may include a phase detector, a loop filter, a voltage-controlled oscillator, and a frequency divider.

In some embodiments, the phase detector may compare the frequency and/or phase of the input signal with an output signal of the voltage-controlled oscillator. If a phase (or frequency) difference is detected within the operating range of the phase-locked loop 900, an error signal Ve(t) may be generated. The error signal Ve(t) may be proportional to the phase difference between the input signal and the output signal of the voltage-controlled oscillator. The loop filter may filter the AC component of the error signal Ve(t), and generate a signal Vd(t) to control the voltage-controlled oscillator, so that the voltage-controlled oscillator may change its frequency to reduce the phase (or frequency) error. The frequency difference or phase difference between the input signal and the output signal of the voltage-controlled oscillator may be gradually reduced to reach 0.

It should be noted that the above description of the phase-locked loop structure is merely provided for illustration purposes and does not limit the scope of the present disclosure. For those skilled in the art, after understanding the principles of the device, they may arbitrarily combine various components or replace a component with another component without departing from the principle. For example, the phase-locked loop structure may only include a phase detector and a voltage-controlled oscillator. As another example, the phase-locked loop structure may include a phase detector, a charge pump, a loop filter, a voltage-controlled oscillator, and a frequency divider.

Figure 10:
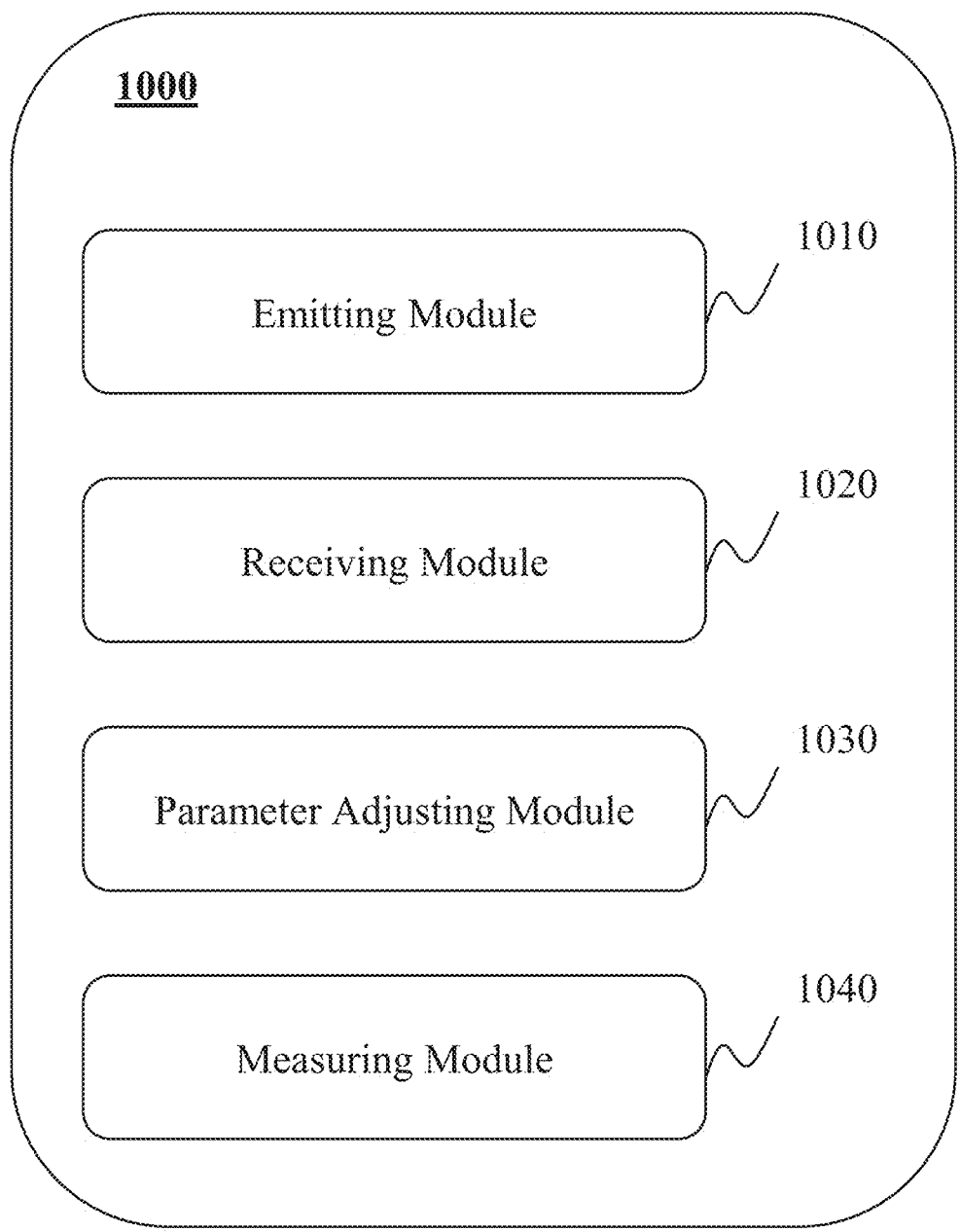
FIG. 10 is a block diagram illustrating an exemplary laser distance measurement device according to some embodiments of the present disclosure.

FIG. 10 is a block diagram illustrating an exemplary laser distance measurement device 1000 according to some embodiments of the present disclosure.

As shown in FIG. 10, the laser distance measurement device 1000 may include an emitting module 1010, a receiving module 1020, a parameter adjusting module 1030, and a measurement module 1040.

The emitting module 1010 may be used to emit a laser beam. In some embodiments, the emitting module 1010 may emit a laser beam under the modulation of a first periodic signal (or a first periodic sequence). For example, the emitting module 1010 may include the laser driver 330 and the laser diode module 340 as shown in FIG. 3, and the laser driver 330 may be used to drive the laser diode module 340 to generate a laser beam 345 under modulation of the first periodic signal. In some embodiments, the emitting module 1010 may emit a laser beam according to one or more emitting windows.

The receiving module 1020 may be used to receive the laser beam reflected by the target. In some embodiments, an optical detector in the receiving module 1020 may convert the received reflected optical signal into an electric signal and perform a signal mixing with a local oscillator signal (or a second periodic signal) to obtain a measurement signal having a low intermediate frequency. For example, the receiving module 1020 may include the optical detector 350 as shown in FIG. 3. The optical detector 350 may receive the reflected laser beam and perform a signal mixing with the local oscillator signal to generate a low intermediate frequency measurement signal.

The parameter adjusting module 1030 may adjust one or more emitting parameters of a laser emitting device. In some embodiments, the parameter adjusting module 1030 may adjust one or more emitting parameters of the laser emitting device according to a test laser beam reflected by the target. For example, the parameter adjusting module 1030 may determine one or more emitting windows based on one or more signal positions in the test laser beam reflected by the target. Details regarding the adjustment of the emitting parameter(s) of a laser emitting device may be found elsewhere in the present disclosure (e.g., FIG. 12 and the relevant descriptions thereof).

The measurement module 1040 may be used to determine the distance to the target. In some embodiments, the measurement module 1040 may determine the distance between the laser distance measurement device 1000 and the target based on the measurement signal and a reference signal. For example, the measurement module 1040 may include the preprocessing module 360 and the signal processor 370 as shown in FIG. 3. The signal processor 370 may receive a preprocessed measurement signal from the preprocessing module 360, and determine the distance between the laser distance measurement device 1000 and the target based on the reference signal and the preprocessed measurement signal.

It should be understood that the modules of the laser distance measurement device shown in FIG. 10 may be implemented in various ways. Accordingly, the laser distance measurement device or its component may be implemented entirely in hardware, entirely in software (including firmware, resident software, micro-code, etc.) or combining software and hardware implementation that may all generally be referred to herein as a "module," "unit," "component," "device," or "system." A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, a CD, a DVD-ROM, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware.

It should be noted that the above description of the laser distance measurement device 1000 is merely provided for illustration purposes and does not limit the scope of the present disclosure. For those skilled in the art, after understanding the principles of the device, they may arbitrarily combine various components or replace a component with one or more other components without departing from the principle. For example, the emitting module 1010 and the receiving module 1020 may be two individual modules or integrated into one single module. As another example, the modules of the laser distance measurement device 1000 may share a single storage module. Alternatively, each module may have its respective storage module. All such variations are within the scope of the present disclosure.

Figure 11:
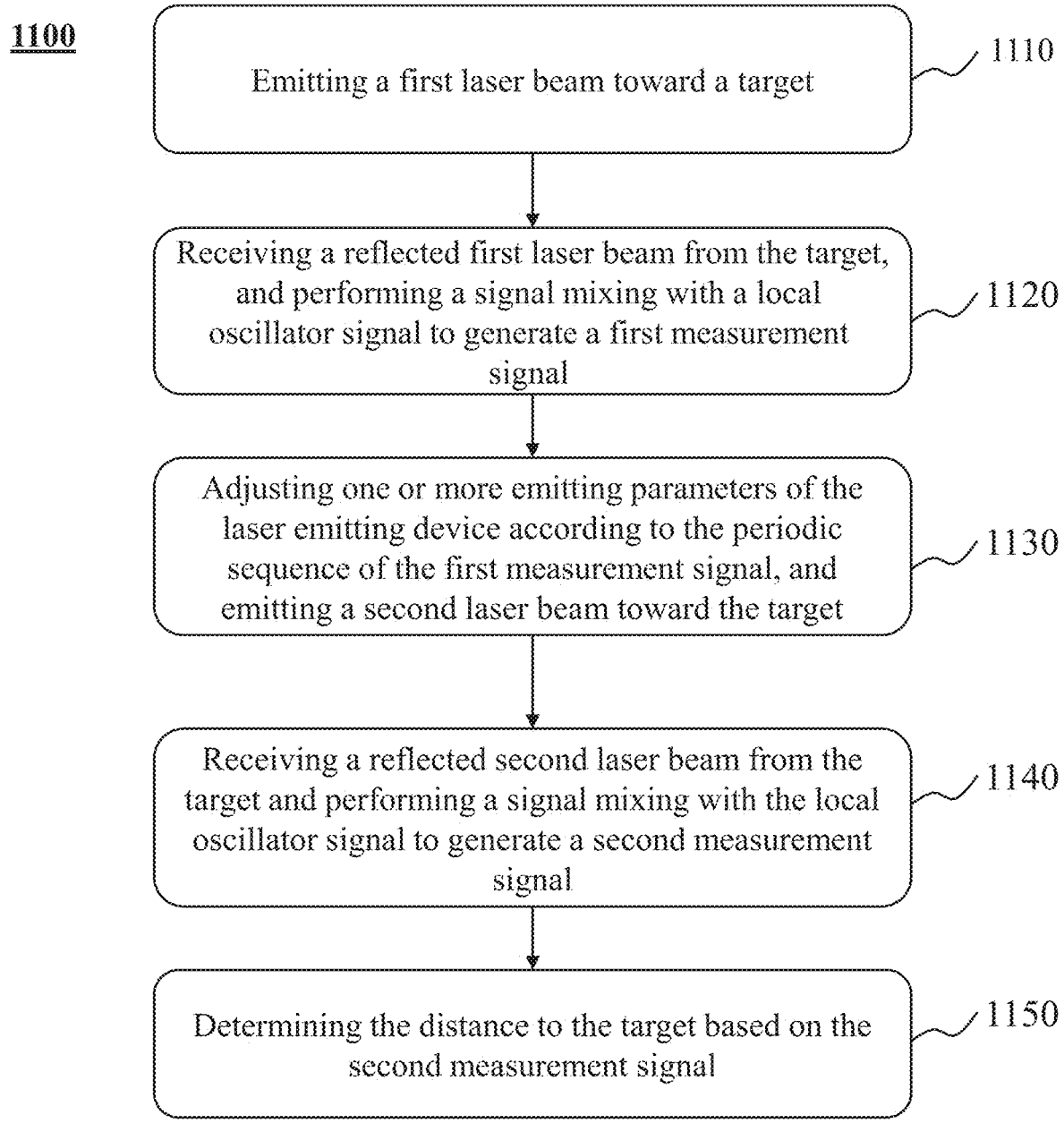
FIG. 11 is a flowchart illustrating an exemplary process for laser distance measurement according to some embodiments of the present disclosure.

FIG. 11 is a flowchart illustrating an exemplary process for laser distance measurement according to some embodiments of the present disclosure. In some embodiments, process 1100 may be performed by a laser distance measurement device (e.g., the laser distance measurement device 100, the laser distance measurement device 300, the laser distance measurement device 1000) disclosed in the present disclosure. The process 1100 may be implemented as a set of instructions (e.g., an application) stored in a storage device (e.g., ROM or RAM). A processing device (e.g., a CPU and/or an engine) of the laser distance measurement device may execute the set of instructions. When the processing device executes the instruction, the process 1100 may be performed by one or more components of the laser distance measurement device. In some embodiments, the operations of the process 1100 are intended to be illustrative. The process 1100 may be accomplished with one or more additional operations not described and/or without one or more of the operations herein discussed. Additionally, the order in which the operations of the process 1100 described above is not intended to be limiting. For illustration purposes, the implementation of the process 1100 by the laser distance measurement device 1000 is described hereinafter as an example.

In 1110, the emitting module 1010 may emit a first laser beam toward a target.

In some embodiments, the emitting module 1010 may generate the first laser beam under the modulation of a first periodic sequence. For example, the laser driver 330 may drive a laser diode to emit the first laser beam to the target under the modulation of the first periodic sequence. In some embodiments, the first periodic sequence may be a high frequency (e.g., 5 MHz) signal sequence. In some embodiments, the first periodic sequence may be the same as or similar to the sequence of the first periodic signal described elsewhere in the present disclosure.

In 1120, the receiving module 1020 may receive a reflected first laser beam from the target, and perform a signal mixing with a local oscillator signal to generate a first measurement signal.

Similar to those described in connection with operation 440 in process 400, the first laser beam may be reflected by the target and transmitted to the receiving module 1020. The optical detector in the receiving module 1020 may receive the reflected laser signal and perform the signal mixing with the local oscillator signal to obtain the first measurement signal. In some embodiments, the local oscillator signal may be a high frequency periodic signal with a same phase as the first periodic sequence and a small frequency difference with respect to the first periodic sequence. For example, the frequency of the local oscillator signal may be 4.999 MHz, and the frequency of the first periodic sequence may be 5 MHz. The frequency of the first measurement signal generated after the signal mixing process may be equal to the difference between the frequencies of the first periodic sequence and the local oscillator signal, that is, 1 KHz.

Figure 13:
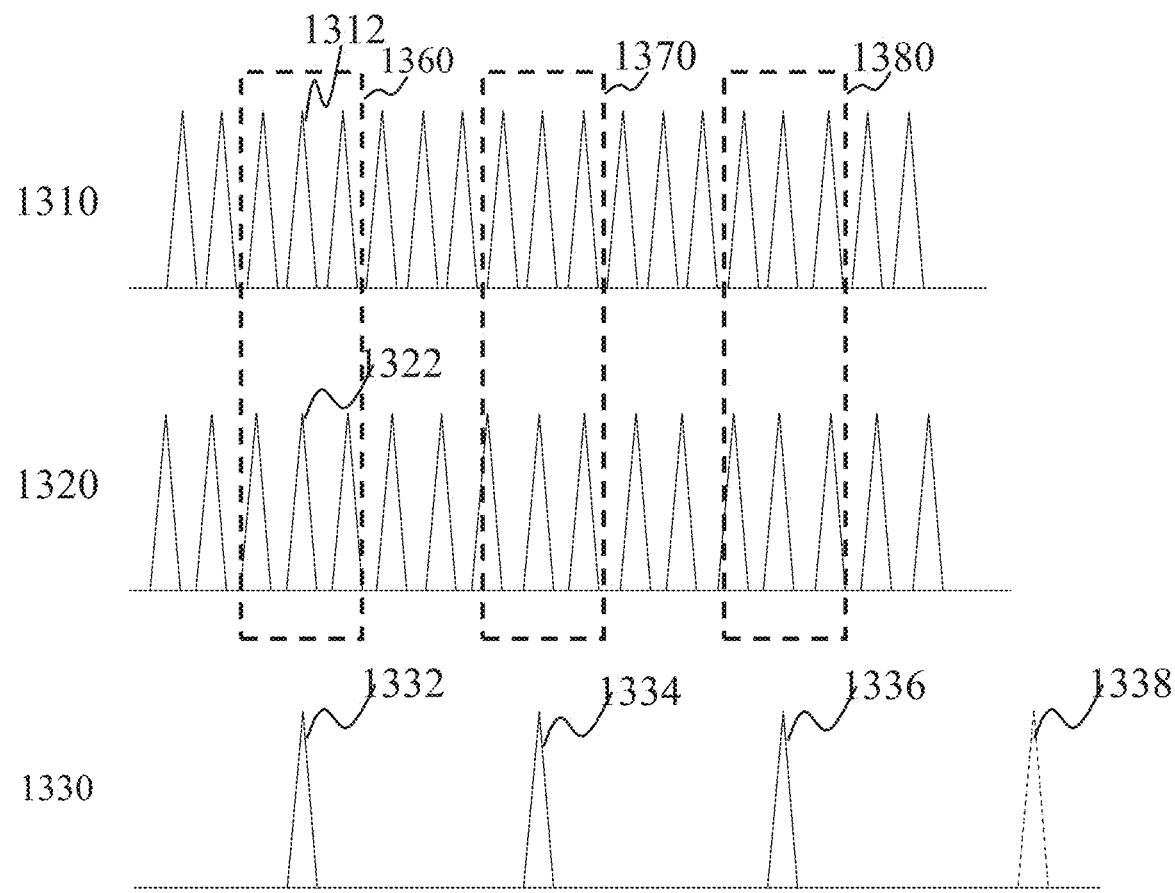
FIG. 13 is a schematic diagram illustrating an exemplary signal mixing according to some embodiments of the present disclosure.

It should be noted that the signal mixing process may be regarded as a process of "screening" the reflected first laser beam. For illustration purposes, as shown in FIG. 13, the first periodic sequence 1310 may represent an electric signal corresponding to a laser beam reflected by the target (for example, the laser beam 345 in FIG. 3 or the first laser beam reflected by the target as described in connection with operation 1120). The second periodic sequence 1320 may represent a local oscillator signal (e.g., the second periodic signal in FIG. 3, or the local oscillator signal in 1120). The first periodic sequence 1310 and the second periodic sequence 1320 may have similar frequencies. The third periodic sequence 1330 may represent a low intermediate frequency signal (e.g., the first measurement signal in 1120) generated by mixing the first periodic sequence 1310 and the second periodic sequence 1320, and the frequency of the third periodic sequence 1330 may be equal to the difference between the frequencies of the first periodic sequence 1310 and the second periodic sequence 1320.

For illustration purposes, taking a pulse signal (such as a triangular wave) as an example, the signal mixing process may be considered as a result of the interactions between the pulses in the first periodic sequence 1310 and the second periodic sequence 1320. A pulse in the third periodic sequence 1330 may be generated only when one pulse of the first periodic sequence 1310 and one pulse of the second periodic sequence 1320 occur simultaneously, that is, when the two pulses overlap in the time domain. For example, a pulse 1312 in the first periodic sequence 1310 and a pulse 1322 in the second periodic sequence 1320 may overlap in the time domain and interact to produce a pulse 1332 of the third periodic sequence 1330, wherein the pulse 1332 may overlap with the pulse 1312 and the pulse 1322 in the time domain. For the convenience of descriptions, a pulse (e.g., the pulse 1312) in the first periodic sequence 1310 corresponding to a pulse (e.g., the pulse 1332) in the third periodic sequence 1330 may be referred to as a valid pulse. The generation of a pulse in the third periodic sequence 1330 may be associated with the counts of pulses in the first periodic sequence 1310 and the second sequence 1320 (i.e., the durations of the first periodic sequence 1310 and the second periodic sequence 1320) and the positions of the pulses in the two sequences. In some embodiments, if the durations of the first periodic sequence 1310 and the second periodic sequence 1320 are relatively short (for example, the durations are shorter than one cycle of the third periodic sequence 1330), none or only one pulse of the third period sequence 1330 may be generated. If the durations of the first periodic sequence 1310 and the second periodic sequence 1320 are relatively long (for example, the durations are longer than one period of the third periodic sequence 1330), more pulses (e.g., pulses 1334, 1336) of the third periodic sequence 1330 may be generated.

Referring back to 1120, the signal mixing process may be regarded as filtering out valid pulses from the periodic sequence corresponding to the reflected first laser beam. The invalid pulse(s) in the periodic sequence corresponding to the reflected first laser beam may become zero after interacting with the local oscillator signal, and be omitted from further analysis. The invalid pulse(s) in the first periodic sequence may result in wasted signals. In some embodiments, parameter(s) of the emitted laser beam may be adjusted based on the position of the valid pulse(s), so that the laser beam may be mainly emitted when a valid pulse appears, thereby reducing the waste of laser signals.

In some embodiments, the first laser beam may be used to determine the position of the valid pulse(s), and may also be referred to as a test laser beam. In order to determine the position of at least one valid pulse in the periodic sequence corresponding to the reflected first laser beam, the duration of the first laser beam (i.e., the duration of the first periodic sequence) may be greater than or equal to a cycle of the first measurement signal. For example, the duration of the first periodic sequence may be 1.5 times, 2 times, 3 times, 4 times, 5 times, 8 times, 10 times, 15 times, etc., of the cycle of the first measurement signal.

In some embodiments, the duration of the first laser beam may affect the measurement accuracy. For example, if the duration of the first laser beam emitted by the emitting module 1010 is equal to one cycle of the first measurement signal, only one valid pulse (i.e., the position of a pulse in the first measurement signal) and its position may be determined, and the determination result may probably have an error due to the measurement environment, the operation mode, and/or other factors. If the duration of the first laser beam is not less than the duration of multiple cycles of the first measurement signal, a plurality of valid pulses and their positions may be determined, and the positions may be combined (for example, by analyzing the positional relationship between the positions) to reduce or eliminate the error caused by factors including, such as the measurement environment and/or operation mode.

In some alternative embodiments, in order to obtain the position of at least one valid pulse in the periodic sequence corresponding to the reflected first laser beam, the first laser beam may be emitted based on one or more first emitting windows. The width of each of the first emitting window(s) may be shorter than a cycle of the first measurement signal. For example, the width of a first emitting window may be ½, ⅓, ¼, ⅕, ⅙, or the like, of the cycle of the first measurement signal. The widths of different first emitting windows may be the same or different.

In some embodiments, a plurality of first emitting windows may be continuously arranged in the time domain. If the first laser beam emitted within the current first emitting window produces a valid pulse, the first laser beam may be stopped from being emitted. In some embodiments, a plurality of first emitting windows may be discontinuously arranged in the time domain. For example, two first emitting windows may be located in two different cycles of the first measurement signal in the time domain. Specifically, the starting point of one of the first emitting windows may be $t_1$, the starting point of the other first emitting window may be $t_2$, and the two first emitting windows may satisfy Equation (2) as below in the time domain:

$$t_2 = t_1 + m*L + n*T, \qquad (2)$$

where L refers to the width of a first emitting window, T refers to the cycle of the first measurement signal, and m and n may be integers (e.g., 0, 1, 2, 3, 4, or the like). In this way, the width of each first emitting window may be less than the cycle of the first measurement signal, and the power of the first laser beam emitted in a first emitting window can be increased when the average power of the first laser beam emitted by the emitting module remains constant. This may further increase the anti-interference ability in the measurement process and improve the measurement accuracy.

In 1130, the parameter adjusting module 1030 may adjust one or more emitting parameters of the laser emitting device according to the periodic sequence of the first measurement signal, and emit a second laser beam toward the target.

In some embodiments, the parameter adjusting module 1030 may estimate the position of one or more valid pulses according to the positions of one or more pulses in the first measurement signal, and adjust one or more emitting parameters of the laser emitting device accordingly. In some embodiments, the emitting parameter(s) may include an emitting time, an emitting frequency, an emitting power, an emitting length, or the like, or any combination thereof. For example, the parameter adjusting module 1030 may determine one or more emitting windows according to the estimated positions of one or more valid pulses, so that the emitting module 1010 may transmit the second laser beam within the emitting window(s). Details regarding the emission of the second laser beam may be found elsewhere in the present disclosure (e.g., FIG. 12 and the relevant descriptions thereof).

In 1140, the receiving module 1020 may receive a reflected second laser beam from the target and perform a signal mixing with the local oscillator signal to generate a second measurement signal.

Similar to those described in connection with operation 1120, the second laser beam may be reflected by the target and transmitted to the receiving module 1020. The optical detector of the receiving module 1020 may mix the reflected second laser beam with the local oscillator signal to obtain the second measurement signal with a low intermediate frequency.

In 1150, the measurement module 1040 may determine the distance from the laser distance measurement device to the target based on the second measurement signal.

In some embodiments, the measurement module 1040 may determine the distance between the laser distance measurement device and the target based on a phase difference between the second measurement signal and a reference signal. The second laser beam may be emitted by the laser emitting device toward the target and reflected by the target, during which a phase shift may occur. The phase of the reference signal may be synchronized with the local oscillator signal, the periodic sequence phase of the second laser beam (also be referred to as a second laser beam sequence) emitted by the laser emitting device. The phase shift of the second measurement signal may be determined based on the phase difference between the reference signal and the second measurement signal, and the distance from the laser distance measurement device to the target may be determined based on the phase shift. In some embodiments, the reference signal, the local oscillator signal, and the second laser beam sequence may be generated by a same signal generator. For example, process 400 may be used to generate the reference signal (corresponding to the third periodic signal in process 400), the local oscillator signal (corresponding to the second periodic signal in process 400), and the second laser beam sequence (corresponding to the first periodic signal in process 400 along with one or more specific emitting windows). If the phases of the reference signal, the local oscillator signal, and the second laser beam sequence are all $V_1$, the phase of the second measurement signal is $V_2$, the distance between the laser distance measurement device and the target may be determined based on the phase difference between the second measurement signal and the reference signal in a same period according to, e.g., Equation (1) described above.

For illustration purposes, the process 1100 is described by taking the process 400 as an example, and this is not intended to be limiting. It may be appreciated that the process 1100 may be applied in any other laser distance measurement techniques, for example, a double-emitting and double-receiving laser distance measurement technique that utilizes two laser emitting devices and two optical detectors, a single-emitting and double-receiving laser distance measurement technique that utilizes one laser emitting device and two optical detectors, a single-emitting and single-receiving laser distance measurement technique that utilizes one laser emitting device and one optical detector, a double-emitting and single-receiving laser distance measurement technique that utilizes two laser emitting devices and one optical detector, or the like.

In some embodiments, a double-emitting and double-receiving laser distance measurement technique may be utilized. The emitting module 1010 may include two laser emitting devices, and the receiving module 1020 may include two optical detectors. One of the optical detectors may be used for receiving the measurement optical signal and generating a low intermediate frequency measurement signal. The other one of the optical detectors may be used for receiving the reference optical signal and generating a low intermediate frequency reference signal. The emitting module 1010 may emit the first laser beam by at least one of two laser emitting devices (e.g., the first laser emitting device and/or the second laser emitting device). The receiving module 1020 may receive the reflected first laser beam and generate a first measurement signal corresponding to the reflected first laser beam. The parameter adjusting module 1030 may adjust laser emitting parameter(s) according to the signal position(s) in the first measurement signal corresponding to the reflected first laser beam. Each of the two laser emitting devices of the emitting module 1010 may emit a second laser beam based on the adjusted emitting parameter(s). The receiving module 1020 may receive two reflected second laser beams and generate a second measurement signal and a reference signal, and the measurement module 1040 may determine the distance of the target based on the second measurement signal and the reference signal.

In some embodiments, a double-emitting and single-receiving laser distance measurement technique may be utilized. The emitting module 1010 may include two laser emitting devices, and the receiving module 1020 may include one optical detector. The optical detector may be configured to receive the measurement optical signal and the reference optical signal, and generate a measurement signal and a reference signal having low intermediate frequencies.

It should be noted that the above description of the process 1100 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, in 1140, the receiving module may first convert the received optical signal reflected from the target into an electric signal using the optical detector, and then down-convert the electric signal using a low-pass filter to generate the second measurement signal.

Figure 12:
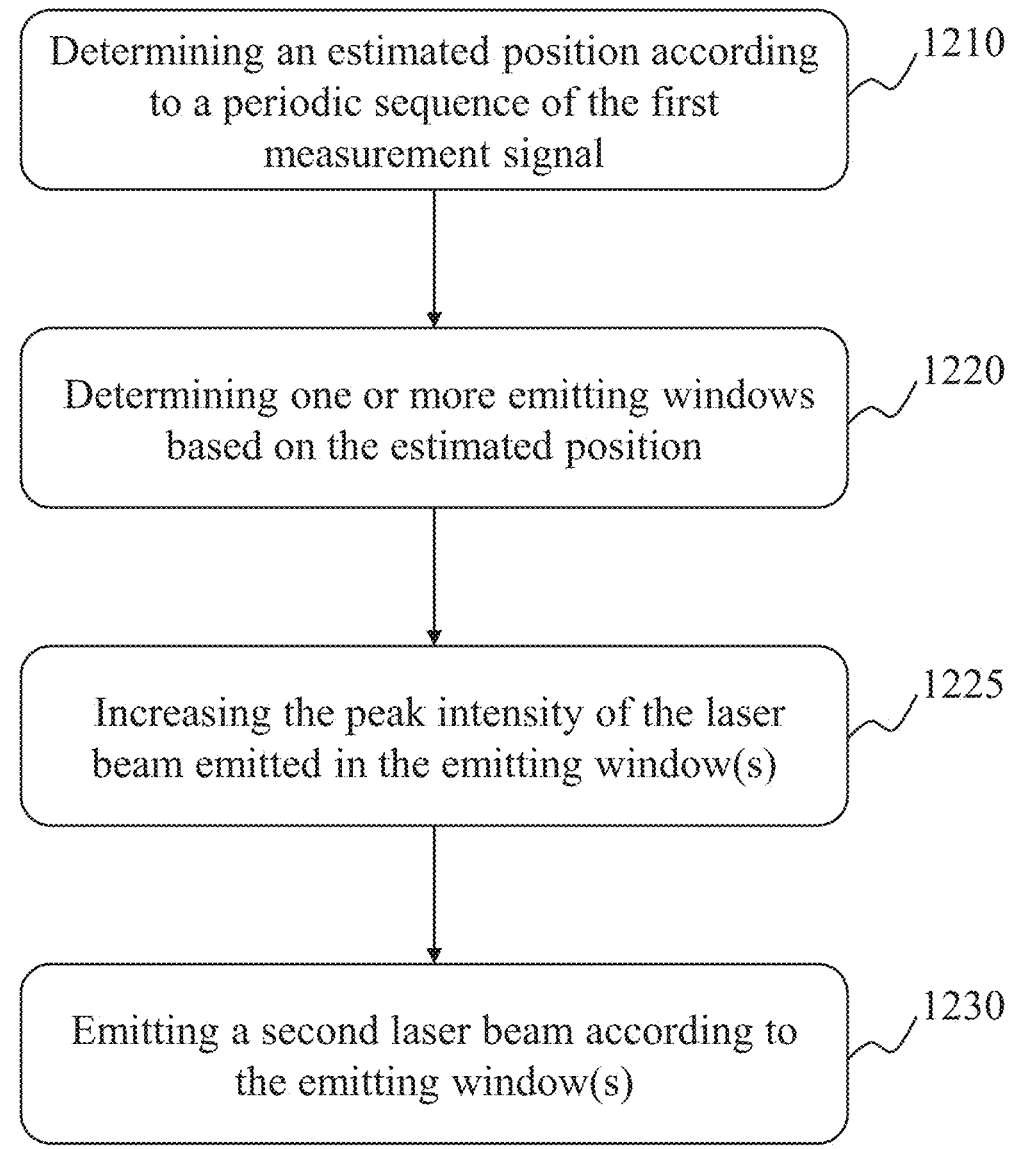
FIG. 12 is a flowchart illustrating an exemplary process for emitting a second laser beam according to some embodiments of the present disclosure.

FIG. 12 is a flowchart illustrating an exemplary process for emitting a second laser beam according to some embodiments of the present disclosure. In some embodiments, process 1200 may be performed by a laser distance measurement device (e.g., the laser distance measurement device 100, the laser distance measurement device 300, the laser distance measurement device 1000) disclosed in the present disclosure. The process 1200 may be implemented as a set of instructions (e.g., an application) stored in a storage device (e.g., ROM or RAM). A processing device (e.g., a CPU and/or an engine) of the laser distance measurement device may execute the set of instructions. When the processing device executes the instruction, the process 1200 may be performed by one or more components of the laser distance measurement device. In some embodiments, the operations of the process 1200 are intended to be illustrative. The process 1200 may be accomplished with one or more additional operations not described and/or without one or more of the operations herein discussed. Additionally, the order in which the operations of the process 1200 described above is not intended to be limiting. For illustration purposes, the implementation of the process 1200 by the laser distance measurement device 1000 is described hereinafter as an example. In some embodiments, operation 1130 of the process 1100 may be implemented by the process 1200.

In 1210, the parameter adjusting module 1030 may determine an estimated position according to a periodic sequence of the first measurement signal.

In some embodiments, the positions of one or more pulses in the periodic sequence of the first measurement signal may reflect the position where a pulse of the reflected first laser beam overlaps with a pulse in the local oscillator signal, that is, the position of a valid pulse. For example, if the abscissa of a pulse of the first measurement signal is 10 nanoseconds, the reflected first laser beam may overlap with one pulse of the local oscillator signal at the time of 10 nanoseconds. In some embodiments, the parameter adjusting module 1030 may determine an estimated position of a pulse according to the positions of one or more pulses in the periodic sequence of the first measurement signal.

In some embodiments, as shown in FIG. 13, the pulses of the third periodic sequence 1330 may appear at a fixed frequency (i.e., the frequency difference between the frequencies of the first periodic sequence 1310 and the second periodic sequence 1320). The position of at least one of the pulses of the third sequence 1330 may be known, and the time at which the subsequent one or more pulses occur may be determined based on the period of the third periodic sequence 1330. The time at which a subsequent pulse occurs may be also referred to as the estimated position of the subsequent pulse. For example, the estimated position of pulse 1338 may occur after the position of the pulse 1336 at a distance of one period of the third periodic sequence 1330 (i.e., the time difference between pulse 1332 and pulse 1334, or the inverse of the frequency difference between the first periodic sequence 1310 and the second periodic sequence 1320). As used herein, the position of a pulse may refer to the position of a feature point of the pulse. For example, a certain pulse may be a triangular pulse with a narrow pulse width and a high peak, and its position may refer to the time point having the greatest amplitude of the triangular pulse.

In some embodiments, according to one or more (estimated) pulses of the third periodic sequence 1330, one or more time windows may be determined. Each time window may cover the position (i.e. the time of occurrence) of a valid pulse corresponding to one or more (estimated) pulses in the third periodic sequence 1330. For example, pulse 1332 may correspond to a time window 1360. The time window 1360 may cover the position of the valid pulse 1312.

In 1220, the parameter adjusting module 1030 may determine one or more laser beam emitting windows based on the estimated position.

In some embodiments, the parameter adjusting module 1030 may determine one or more laser beam emitting windows according to the estimated positions of one or more pulses. Each laser beam emitting window may cover the estimated position of at least one of the pulse(s).

In some embodiments, an error may exist in the determination of the estimated position of the pulse (for example, when the position of the laser distance measurement device at which the second laser beam is emitted is greatly different from that at which the first laser beam is emitted, the estimation of the position of the pulse based on the first laser beam may be inaccurate), which may lead to that the estimated position of the pulse and the valid pulse may not completely overlap. If the error is big and the width of an emitting window is too small, no signal may be generated by mixing the reflected second laser beam and the local oscillator signal. Therefore, in some embodiments, the width of an emitting window may be longer than the cycle of the first periodic sequence. For example, the width of an emitting window may be at least 2 times, 3 times, 4 times, 5 times, 8 times, 10 times, etc., of the cycle of the first periodic sequence.

In some embodiments, the estimated position of at least one pulse may be at the center of its corresponding emitting window. For example, the parameter adjusting module 1030 may determine the estimated position of a pulse as the center of the corresponding emitting window, and the width of the emitting window may cover one or more cycles of the first periodic sequence. In some embodiments, the estimated position of at least one pulse may not be located at the central point of its corresponding emitting window. For example, taking into consideration that a certain delay may exist between the time when the optical detector 350 receives a reflected laser beam and the time when the laser diode module 340 transmits the laser beam, the estimated position of the pulse may be set to the right of the central position of the corresponding emitting window. That is, the center of the emitting window may be located to the left of the estimated position (i.e., the center of the emitting window may occur before the estimated position). Alternatively, the estimated position of the pulse may be between the center of its corresponding emitting window and the right edge of the emitting window. Optionally, the estimated position of the pulse may be located to the right of the center position of its corresponding emitting window and deviate from the center position for a predetermined distance (e.g., 1/10, 1/8, 1/6, 1/4, 1/3, 1/2, etc., of the emitting window width). In some embodiments, the estimated position of the pulse may be located to the left of the center of its corresponding emitting window.

Figure 14:
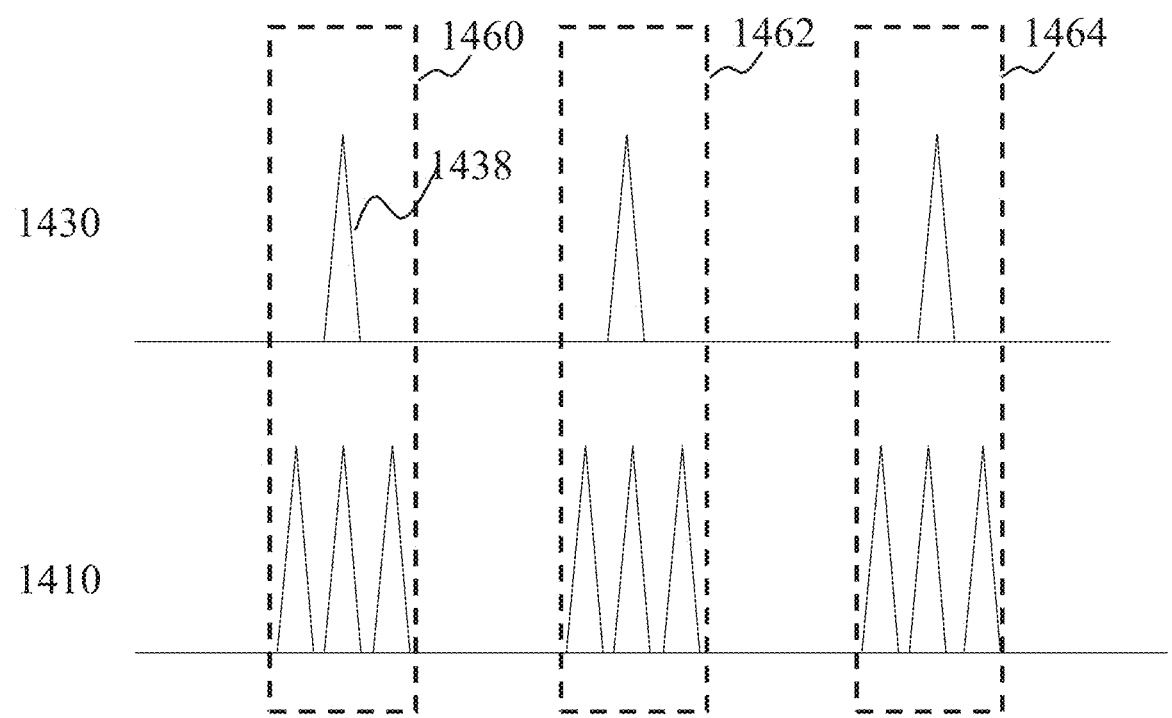
FIG. 14 is a schematic diagram illustrating an exemplary emitting window according to some embodiments of the present disclosure.

For purposes of illustration, FIG. 14 illustrates an exemplary emitting window determined based on an estimated position of a pulse according to some embodiments of the present disclosure. As shown in FIG. 14, a periodic sequence 1430 may represent some estimated positions of pulses in the time domain. For example, similar to the estimated pulse 1338 in FIG. 13, the pulse 1438 may be determined based on one or more pulses (e.g., pulses 1332, 1334, 1336, etc.) of a low intermediate frequency signal (e.g., the first measurement signal in 1120) generated in response to one or more test laser beams. Based on the position of pulse 1438, a time window 1460 that covers the time period of the pulse 1438 may be determined. That is, an estimated pulse (at the estimated position) may occur in the low intermediate frequency signal generated by the signal mixing if the optical detector receives a valid pulse within the time window 1460. In some embodiments, taking into consideration that a small delay may occur between the time when the optical detector 350 receives the reflected laser beam and the time when the laser diode module 340 emits the laser beam, as long as the time window 1460 has a predetermined width, it may be supposed that the laser beam generated within the time window 1460 may enable that the optical detector receives a valid pulse for generating pulse 1438. In such cases, the time window 1460 may serve as the emitting window of the laser beam. For example, a periodic sequence 1410 may represent the laser signal emitted by the laser diode module 340. The laser diode module 340 may emit laser beams in the emitting windows (e.g., 1460, 1462, and 1464). The repetition frequency of the emitting windows (e.g., 1460, 1462, and 1464) may be equal to the repetition frequency of the periodic sequence 1430.

In 1225, the parameter adjusting module 1030 may increase the peak intensity of the laser beam emitted in the emitting window(s).

In some embodiments, the parameter adjusting module 1030 may increase the peak intensity of the laser beam emitted within the emitting window(s). By increasing the laser beam's peak intensity in the emitting window(s), it may effectively improve the measurement accuracy and reduce the computational difficulty.

In some embodiments, the parameter adjusting module 1030 may increase the peak intensity of the laser beam emitted within the emitting window(s) such that the peak intensity of the laser beam emitted within the emitting window(s) is higher than the peak intensity of the first laser beam (i.e., the test laser beam). For example, the peak intensity of the laser beam emitted in the emitting window(s) may be 1.5 times, 2 times, 3 times, 5 times, 8 times, 10 times, 12 times, 15 times, or the like, of the peak intensity of the first laser beam. In some embodiments, the peak intensity of the laser beam emitted in an emitting window may be related to the width of the emitting window. For example, the peak intensity of the laser beam emitted in the emitting window may have a smaller increment if the width of the emitting window is longer. Merely by way of example, if the width of the emitting window is shorter than three times of the cycle of the first periodic sequence, the peak intensity of the corresponding laser beam emitted in the emitting window may be higher than five times of the peak intensity of the first laser beam. If the width of the emitting window is longer than 5 times of the cycle of the first periodic sequence, the peak intensity of the corresponding laser beam emitted in the emitting window may be lower than 5 times of the peak intensity of the first laser beam. In some embodiments, different laser beams within a same emitting window may have different peak intensities. For example, since that the central region of the emitting window is closer to the estimated position of the pulse, the pulse(s) appearing in the center region of the emitting window may be deemed as making a greater contribution to the measurement signal than other pulse(s). Therefore, the parameter adjusting module 1030 may make the pulse(s) at or close to the estimated position of the pulse in the emitting window have the maximum peak intensity. Specifically, the peak intensity of the pulse(s) at the center region of the emitting window may be higher than the peak intensity of the pulse(s) of other regions of the emitting window.

In 1230, the emitting module 1010 may emit a second laser beam according to the emitting window(s).

In some embodiments, the emitting module 1010 may emit the second laser beam according to the positions of one or more emitting windows. For example, the emitting module 1010 may emit the second laser beam within the one or more emitting windows, and stop emitting the second laser beam out of the one or more emitting windows. In some embodiments, the emitting module 1010 may increase the peak intensity of the second laser beam within the emitting window(s). As another example, the emitting module 1010 may emit the second laser beam within and out of the emitting window(s). The peak intensity of the second laser beam emitted within the emitting window(s) may be higher than the peak intensity of the second laser beam emitted out of the emitting window(s). For example, the peak intensity of the second laser beam emitted within the emitting window(s) may be higher than the peak intensity of the first laser beam, and the peak intensity of the second laser beam emitted out of the emitting window may be lower than the peak intensity of the first laser beam.

By doing so, the emitting period and/or the intensity distribution of the second laser beam may be adjusted based on the first measurement signal, which may reduce or eliminate the output of signals that have no effect on the generation of the final measurement signal in the time domain, and reduce the emitting burden of the emitting module to some extent. In the case that the average power of the laser beam emitted by the emitting module is constant, the emitting of the second laser beam may effectively improve the energy of the valid pulse, the anti-interference ability in the measurement process, and the measurement accuracy.

It should be noted that the above description of the process 1200 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, in 1230, after the laser emitting device emits the second laser beam toward the target, the laser emitting parameter(s) may be further adjusted to emit a third laser beam based on the mixing result of the second laser beam reflected by the target and the local oscillator signal.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate 20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for laser distance measurement, comprising:
obtaining, from a control circuit, a synchronization signal;
generating, by at least one signal generator, a first periodic signal, a second periodic signal, and a third periodic signal based on the synchronization signal;
emitting, by a laser emitting device, a laser beam toward a target, the laser beam being generated under a modulation of the first periodic signal;
generating, by an optical detector, a measurement signal in response to a signal mixing of the second periodic signal and a reflected laser beam from the target; and
determining a distance to the target based on the measurement signal and the phase of third periodic signal.

2. The method of claim 1, wherein:
the at least one signal generator includes a first frequency divider, a second frequency divider, and a third frequency divider, and
the first periodic signal, the second periodic signal, and the third periodic signal are generated by the first frequency divider, the second frequency divider, and the third frequency divider, respectively.

3. The method of claim 2, wherein the first frequency divider, the second frequency divider, and the third frequency divider divide a same source signal to generate the first periodic signal, the second periodic signal, and the third periodic signal.

4. The method of claim 2, wherein the first frequency divider, the second frequency divider, and the third frequency divider divide at least two different source signals to generate the first periodic signal, the second periodic signal, and the third periodic signal.

5. The method of claim 2, wherein the first frequency divider, the second frequency divider, or the third frequency divider at least includes one decimal frequency divider.

6. The method of claim 1, wherein a frequency of the third periodic signal is equal to a difference between a frequency of the first periodic signal and a frequency of the second periodic signal.

7. The method of claim 1, wherein the generating, by the at least one signal generator, the first periodic signal, the second periodic signal, and the third periodic signal based on the synchronization signal includes:
controlling, based on the synchronization signal, the at least one signal generator to generate the first periodic signal, the second periodic signal, and the third periodic signal, wherein the phases of the first periodic signal, the second periodic signal, and the third periodic signal are synchronous.

8. A method for laser distance measurement, comprising:
emitting, by a laser emitting device, a first laser beam toward a target;
generating, by an optical detector, a first measurement signal in response to a signal mixing of a local oscillator signal and a reflected first laser beam from the target, the first measurement signal corresponding to a periodic sequence;
adjusting, based at least in part on one or more signal positions in the periodic sequence, one or more emitting parameters of the laser emitting device to emit a second laser beam toward the target;
generating, by the optical detector, a second measurement signal in response to a signal mixing of the local oscillator signal and a reflected second laser beam from the target; and
determining, based on the second measurement signal, a distance to the target.

9. The method of claim 8, wherein the first laser beam has a first periodic sequence, and a frequency of the periodic sequence is equal to a difference between a frequency of the first periodic sequence and a frequency of the local oscillator signal.

10. The method of claim 9, wherein a duration of the first laser beam is greater than or equal to a cycle of the periodic sequence.

11. The method of claim 10, wherein the duration of the first laser beam is at least 1 to 5 times of the cycle of the periodic sequence.

12. The method of claim 9, wherein a duration of the first laser beam is less than a cycle of the periodic sequence.

13. The method of claim 9, wherein the adjusting, based at least in part on one or more signal positions in the periodic sequence, one or more emitting parameters of the laser emitting device to emit a second laser beam toward the target includes:
   determining one or more emitting windows based at least in part on the one or more signal positions in the periodic sequence; and
   emitting the second laser beam according to the one or more emitting windows, wherein the second laser beam is emitted within the one or more emitting windows and stopped from being emitted out of the one or more emitting windows.

14. The method of claim 13, wherein a peak intensity of the second laser beam in the one or more emitting windows is higher than a peak intensity of the first laser beam.

15. The method of claim 13, wherein the determining one or more emitting windows includes:
   determining one or more estimated positions based on the one or more signal positions in the periodic sequence; and
   determining the one or more emitting windows according to the one or more estimated positions, each emitting window covering at least one of the one or more estimated positions.

16. The method of claim 15, wherein at least one of the one or more estimated positions is at a center of its corresponding emitting window.

17. The method of claim 15, wherein at least one of the one or more estimated positions is located to the right of the center of its corresponding emitting window.

18. The method of claim 13, wherein a repetition frequency of the one or more emitting windows is equal to a repetition frequency of the periodic sequence.

19. The method of claim 13, wherein a width of the one or more emitting windows is at least 1 to 3 times of a cycle of the first periodic sequence.

20. The method of claim 8, wherein the adjusting, based at least in part on one or more signal positions in the periodic sequence, one or more emitting parameters of the laser emitting device to emit a second laser beam toward the target includes:
   determining one or more emitting windows based at least in part on the one or more signal positions in the periodic sequence; and
   emitting the second laser beam according to the one or more emitting windows, a peak intensity of the second laser beam in the one or more emitting windows is higher than a peak intensity of the second laser beam out of the one or more emitting windows.

* * * * *